United States Patent
Lin et al.

(10) Patent No.: US 10,986,585 B2
(45) Date of Patent: Apr. 20, 2021

(54) METHOD AND APPARATUS FOR TRIGGERING POWER HEADROOM REPORT FOR MULTIPLE PATHLOSS REFERENCE IN A WIRELESS COMMUNICATION SYSTEM

(71) Applicant: ASUSTek Computer Inc., Taipei (TW)

(72) Inventors: Ko-Chiang Lin, Taipei (TW); Yu-Hsuan Guo, Taipei (TW); Ming-Che Li, Taipei (TW); Hsin-Hsi Tsai, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/395,760

(22) Filed: Apr. 26, 2019

(65) Prior Publication Data

US 2019/0349866 A1 Nov. 14, 2019

Related U.S. Application Data

(60) Provisional application No. 62/669,461, filed on May 10, 2018.

(51) Int. Cl.
*H04W 52/24* (2009.01)
*H04W 52/14* (2009.01)
(Continued)

(52) U.S. Cl.
CPC ....... *H04W 52/242* (2013.01); *H04W 52/146* (2013.01); *H04W 52/365* (2013.01); *H04W 72/14* (2013.01)

(58) Field of Classification Search
CPC ............. H04W 52/242; H04W 52/146; H04W 52/365; H04W 72/14
See application file for complete search history.

(56) References Cited

U.S. PATENT DOCUMENTS

2010/0272046 A1\* 10/2010 Guo ..................... H04W 52/365
370/329
2010/0272091 A1 10/2010 Fabien et al.
(Continued)

FOREIGN PATENT DOCUMENTS

| CN | 103813430 | 5/2014 |
| CN | 107534942 | 1/2018 |

(Continued)

OTHER PUBLICATIONS

Asustek, "Pathloss reference change for triggering PHR", 3GPP TSG-RAN WG2 Meeting #101 bis, R2-1804289, 16th-20th.
(Continued)

*Primary Examiner* — Md K Talukder
(74) *Attorney, Agent, or Firm* — Skaar Ulbrich Macari, P.A.

(57) ABSTRACT

A method and apparatus are disclosed from the perspective of an User Equipment (UE). In one embodiment, the method includes the UE deriving a first pathloss value from a first pathloss reference of a serving cell, wherein the first pathloss value is used for deriving a power headroom value included in a first power headroom report. The method also includes the UE deriving a second pathloss value from a second pathloss reference of the serving cell after deriving the first pathloss value, wherein the second pathloss reference is used for power control for a first Physical Uplink Shared Channel (PUSCH) transmission on the serving cell. The method further includes the UE deriving the pathloss change based on the first pathloss value and the second pathloss value. In addition, the method includes the UE determining whether a second power headroom report is triggered based on whether the pathloss change is more than a threshold.

20 Claims, 27 Drawing Sheets

(51) Int. Cl.
*H04W 52/36* (2009.01)
*H04W 72/14* (2009.01)

(56) References Cited

U.S. PATENT DOCUMENTS

| | | | |
|---|---|---|---|
| 2010/0273515 A1 | 10/2010 | Fabien | |
| 2013/0121203 A1* | 5/2013 | Jung | H04W 52/365 370/252 |
| 2015/0282150 A1* | 10/2015 | Nigam | H04W 28/0278 370/329 |
| 2016/0057712 A1* | 2/2016 | Wen | H04W 52/365 370/329 |
| 2016/0165556 A1 | 6/2016 | Heo et al. | |
| 2016/0270094 A1* | 9/2016 | Dinan | H04W 52/325 |
| 2016/0330698 A1* | 11/2016 | Loehr | H04W 72/04 |
| 2017/0019864 A1 | 1/2017 | Hwang et al. | |
| 2017/0019866 A1* | 1/2017 | Malkamaki | H04W 24/10 |
| 2017/0359734 A1* | 12/2017 | Lee | H04B 7/0617 |
| 2018/0132197 A1* | 5/2018 | Lin | H04W 52/42 |
| 2018/0310257 A1* | 10/2018 | Papasakellariou | H04W 52/50 |
| 2019/0349866 A1* | 11/2019 | Lin | H04B 7/0426 |
| 2020/0084735 A1* | 3/2020 | Cheng | H04W 52/146 |
| 2020/0107272 A1* | 4/2020 | He | H04L 5/0053 |

FOREIGN PATENT DOCUMENTS

| | | |
|---|---|---|
| CN | 107889209 | 4/2018 |
| EP | 3319376 | 5/2019 |
| WO | 2012060659 A2 | 5/2012 |
| WO | 2012145974 | 11/2012 |
| WO | 2016158535 | 1/2018 |

OTHER PUBLICATIONS

Office Action from TIPO in corresponding TIPO Application No. 108114737, dated Jan. 9, 2020.

3GPP Technical Specification, 3rd Generation Partnership Project; Technical Specification Group Radio Access Network; NR; Physical layer procedures for control, (Release 15), 3GPP TS 38.213 V15.1.0, Mar. 2018.

Asustek: "Pathloss reference change for triggering PHR", 3GPP Draft; R2-1804289, 3rd Generation Partnership Project (3GPP), Mobile Competence Centre ; 650, Route Des Lucioles ; F-06921 Sophia-Antipolis Cedex ;France vol. RAN WG2, no. Sanya, China; Apr. 16, 2018-Apr. 20, 2018 Apr. 14, 2018 (Apr. 14, 2018), XP051428045.

Huawei et al: "Consideration on PHR with multi-beam operation", 3GPP Draft; R2-1801043 Consideration on PHR With Multi-Beam Operation, 3rd Generation Partnership Project (3GPP), Mobile Competence Centre ; 650, Route Des Lucioles : F-06921 Sophia-Antipolis Cedex vol. RAN WG2, no. Vancouver, Canada; Jan. 22, 2018-Jan. 26, 2018 Jan. 12, 2018 (Jan. 12, 2018), XP051386539.

Asustek: "Impact of pathloss reference on PHR triggering",3GPP Draft; R2-1806917, 3rd Generation Partnership Project (3GPP), Mobile Competence Centre ; 650, Route Des Lucioles ; F-06921 Sophia-Antip0lis Cedex ;France vol. RAN WG2, no. Busan, Korea; May 21, 2018-May 25, 2018 May 20, 2018 (May 20, 2018), XP051443358.

European Search Report from corresponding EP Application No. 19171289.2, dated Sep. 24, 2019.

Huawei, HISilicon, "Consideration on PHR Multi-Beam Operation", R2-1801043 Revision of R2-1713177, 3GPP TSG-RAN2 Meeting #AH-1801, Vancouver, Canada, Jan. 22-26, 2018.

Asustek, "Pathloss Reference Change for Triggering PHR", R2-1804289 (Resubmission of R2-1801899), 3GPP TSG-RAN WG2 Meeting #101 bis, Sanya, China, Apr. 16-20, 2018.

Office Action from Japan Patent Office in corresponding JP Application No. 2019-085017, dated Jun. 16, 2020.

Office Action to the corresponding Korean Patent Application rendered by the Korean Intellectual Property Office (KIPO) dated Oct. 26, 2020, 10 pages (including English translation).

* cited by examiner (a) Digital beamforming (b) Analogue beamforming (c) Hybrid beamforming: Left = fully connected, Right = sub-array

| EUTRA band | Class 1 (dBm) | Tolerance (dB) | Class 2 (dBm) | Tolerance (dB) | Class 3 (dBm) | Tolerance (dB) | Class 4 (dBm) | Tolerance (dB) |
|---|---|---|---|---|---|---|---|---|
| 1 | | | | | 23 | ±2 | | |
| 2 | | | | | 23 | ±$2^2$ | | |
| 3 | | | | | 23 | ±$2^2$ | | |
| 4 | | | | | 23 | ±2 | | |
| 5 | | | | | 23 | ±2 | | |
| 6 | | | | | 23 | ±2 | | |
| 7 | | | | | 23 | ±$2^2$ | | |
| 8 | | | | | 23 | ±$2^2$ | | |
| 9 | | | | | 23 | ±2 | | |
| 10 | | | | | 23 | ±2 | | |
| 11 | | | | | 23 | ±2 | | |
| 12 | | | | | 23 | ±$2^2$ | | |
| 13 | | | | | 23 | ±2 | | |
| 14 | 31 | +2/-3 | | | 23 | ±2 | | |
| | | | | | | | | |
| 17 | | | | | 23 | ±2 | | |
| 18 | | | | | 23 | ±$2^5$ | | |
| 19 | | | | | 23 | ±2 | | |
| 20 | | | | | 23 | ±$2^2$ | | |
| 21 | | | | | 23 | ±2 | | |
| 22 | | | | | 23 | +2/-$3.5^2$ | | |
| 23 | | | | | $23^6$ | ±$2^6$ | | |
| 24 | | | | | 23 | ±2 | | |
| 25 | | | | | 23 | ±$2^2$ | | |
| 26 | | | | | 23 | ±$2^2$ | | |
| 27 | | | | | 23 | ±2 | | |
| 28 | | | | | 23 | +2/-2.5 | | |
| 30 | | | | | 23 | ±2 | | |
| 31 | | | | | 23 | ±2 | | |
| ... | | | | | | | | |

FIG. 6A (PRIOR ART)

| EUTRA band | Class 1 (dBm) | Tolerance (dB) | Class 2 (dBm) | Tolerance (dB) | Class 3 (dBm) | Tolerance (dB) | Class 4 (dBm) | Tolerance (dB) |
|---|---|---|---|---|---|---|---|---|
| ... | | | | | | | | |
| 33 | | | | | 23 | ±2 | | |
| 34 | | | | | 23 | ±2 | | |
| 35 | | | | | 23 | ±2 | | |
| 36 | | | | | 23 | ±2 | | |
| 37 | | | | | 23 | ±2 | | |
| 38 | | | | | 23 | ±2 | | |
| 39 | | | | | 23 | ±2 | | |
| 40 | | | | | 23 | ±2 | | |
| 41 | | | | | 23 | ±2$^2$ | | |
| 42 | | | | | 23 | +2/-3 | | |
| 43 | | | | | 23 | +2/-3 | | |
| 44 | | | | | 23 | +2/[-3] | | |
| 45 | | | | | 23 | ±2 | | |
| ... | | | | | | | | |
| 47 | | | | | 23 | ±2 | | |
| 65 | | | | | 23 | ±2 | | |
| 66 | | | | | 23 | ±2 | | |
| 68 | | | | | 23 | ±2 | | |
| ... | | | | | | | | |
| 70 | | | | | 23 | ±2 | | |

1. NOTE 1: Void
2. NOTE 2: $^2$ refers to the transmission bandwidths (Figure 5.6-1) confined within $F_{UL\_low}$ and $F_{UL\_low}$ + 4 MHz or $F_{UL\_high}$ − 4 MHz and $F_{UL\_high}$, the maximum output power requirement is relaxed by reducing the lower tolerance limit by 1.5 dB
3. NOTE 3: For the UE which supports both Band 11 and Band 21 operating frequencies, the tolerance is FFS.
4. NOTE 4: $P_{PowerClass}$ is the maximum UE power specified without taking into account the tolerance
5. NOTE 5: For a UE that supports both Band 18 and Band 26, the maximum output power requirement is relaxed by reducing the lower tolerance limit by 1.5 dB for transmission bandwidths confined within 815 MHz and 818 MHz.
6. NOTE 6: When NS_20 is signalled, the total output power within 2000-2005 MHz shall be limited to 7 dBm.

FIG. 6B (PRIOR ART)

| PH | Power Headroom Level |
|----|----------------------|
| 0  | POWER_HEADROOM_0     |
| 1  | POWER_HEADROOM_1     |
| 2  | POWER_HEADROOM_2     |
| 3  | POWER_HEADROOM_3     |
| ... | ...                 |
| 60 | POWER_HEADROOM_60    |
| 61 | POWER_HEADROOM_61    |
| 62 | POWER_HEADROOM_62    |
| 63 | POWER_HEADROOM_63    |

| C$_7$ | C$_6$ | C$_5$ | C$_4$ | C$_3$ | C$_2$ | C$_1$ | R |
|---|---|---|---|---|---|---|---|
| P | V | \multicolumn{6}{c}{PH (Type 2, PCell)} |
| R | R | \multicolumn{6}{c}{P$_{CMAX,c}$ 1} |
| P | V | \multicolumn{6}{c}{PH (Type 1, PCell)} |
| R | R | \multicolumn{6}{c}{P$_{CMAX,c}$ 2} |
| P | V | \multicolumn{6}{c}{PH (Type 1, SCell 1)} |
| R | R | \multicolumn{6}{c}{P$_{CMAX,c}$ 3} |

...

| P | V | PH (Type 1, SCell n) |
|---|---|---|
| R | R | P$_{CMAX,c}$ m |

FIG. 9 (PRIOR ART)

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type 2, PUCCH SCell)} |
| R | R | \multicolumn{6}{c}{$P_{CMAX,c}$ 2} |
| P | V | \multicolumn{6}{c}{PH (Type 1, PCell)} |
| R | R | \multicolumn{6}{c}{$P_{CMAX,c}$ 3} |
| P | V | \multicolumn{6}{c}{PH (Type 1, SCell 1)} |
| R | R | \multicolumn{6}{c}{$P_{CMAX,c}$ 4} |

...

| P | V | PH (Type 1, SCell n) |
|---|---|---|
| R | R | $P_{CMAX,c}$ m |

FIG. 10 (PRIOR ART)

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) | | | | | |
| R | R | $P_{CMAX,c}$ 1 | | | | | |
| P | V | PH (Type 1, PCell) | | | | | |
| R | R | $P_{CMAX,c}$ 2 | | | | | |
| P | V | PH (Type 1, SCell 1) | | | | | |
| R | R | $P_{CMAX,c}$ 3 | | | | | |

...

| | | |
|---|---|---|
| P | V | PH (Type 1, SCell n) |
| R | R | $P_{CMAX,c}$ m |

FIG. 11 (PRIOR ART)

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

FIG. 13 (PRIOR ART)

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | -1 | -4 |
| 1 | 0 | -1 |
| 2 | 1 | 1 |
| 3 | 3 | 4 |

FIG. 14 (PRIOR ART)

METHOD AND APPARATUS FOR TRIGGERING POWER HEADROOM REPORT FOR MULTIPLE PATHLOSS REFERENCE IN A WIRELESS COMMUNICATION SYSTEM

CROSS-REFERENCE TO RELATED APPLICATIONS

The present application claims the benefit of U.S. Provisional Patent Application Ser. No. 62/669,461 filed on May 10, 2018, the entire disclosure of which is incorporated herein in its entirety by reference.

FIELD

This disclosure generally relates to wireless communication networks, and more particularly, to a method and apparatus for triggering power headroom report for multiple pathloss reference a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of an User Equipment (UE). In one embodiment, the method includes the UE deriving a first pathloss value from a first pathloss reference of a serving cell, wherein the first pathloss value is used for deriving a power headroom value included in a first power headroom report. The method also includes the UE deriving a second pathloss value from a second pathloss reference of the serving cell after deriving the first pathloss value, wherein the second pathloss reference is used for power control for a first Physical Uplink Shared Channel (PUSCH) transmission on the serving cell. The method further includes the UE deriving the pathloss change based on the first pathloss value and the second pathloss value. In addition, the method includes the UE determining whether a second power headroom report is triggered based on whether the pathloss change is more than a threshold.

BRIEF DESCRIPTION OF THE DRAWINGS

FIGS. 6A and 6B are a reproduction of Table 6.2.2-1 of 3GPP TS 36.101 V14.1.0.

FIG. 9 is a reproduction of FIG. 6.1.3.6a-2 of 3GPP TS 36.321 V14.0.0.

FIG. 10 is a reproduction of FIG. 6.1.3.6a1-3 of 3GPP TS 36.321 V14.0.0.

FIG. 11 is a reproduction of FIG. 6.1.3.6a2-4 of 3GPP TS 36.321 V14.0.0.

FIG. 13 is a reproduction of Table 6.1.3.6a-1 of 3GPP TS 36.321 V14.0.0.

FIG. 14 is a reproduction of Table 7.1.1-1 of 3GPP R1-1805795.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; TS 36.213 v14.0.0, "E-UTRA Physical layer procedures (Release 14)"; TS 36.101 v14.1.0, "E-UTRA User Equipment (UE) radio transmission and reception (Release 14)"; TS 36.321 v14.0.0, "E-UTRA Medium Access Control (MAC) protocol specification (Release 14)"; R1-1805795, "CR to TS 38.213 capturing the RAN1#92bis meeting agreements", Samsung; TS 38.321 v.15.1.0, "MAC layer specification (Release 15)". The standards and documents listed above are hereby expressly incorporated by reference in their entirety.

Figure 1:
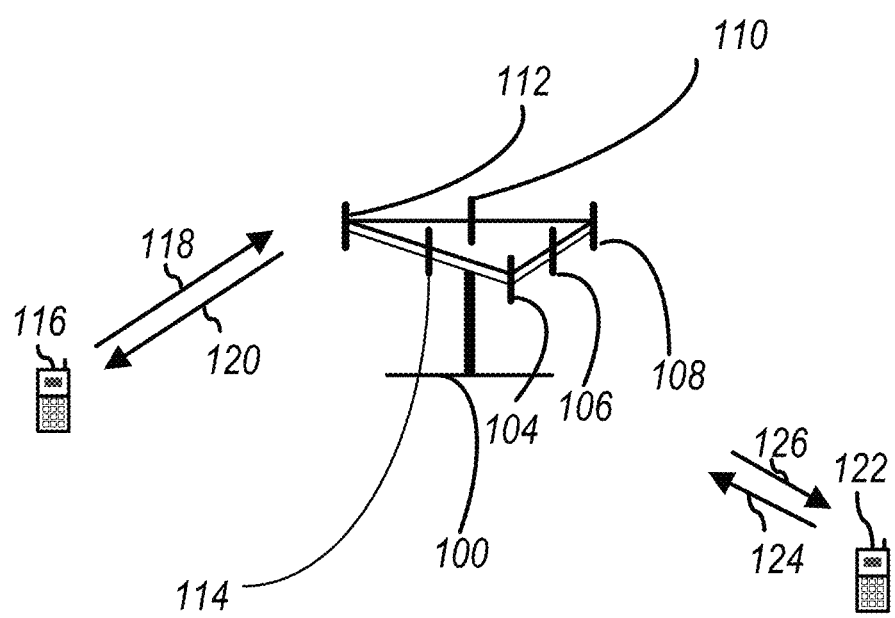
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
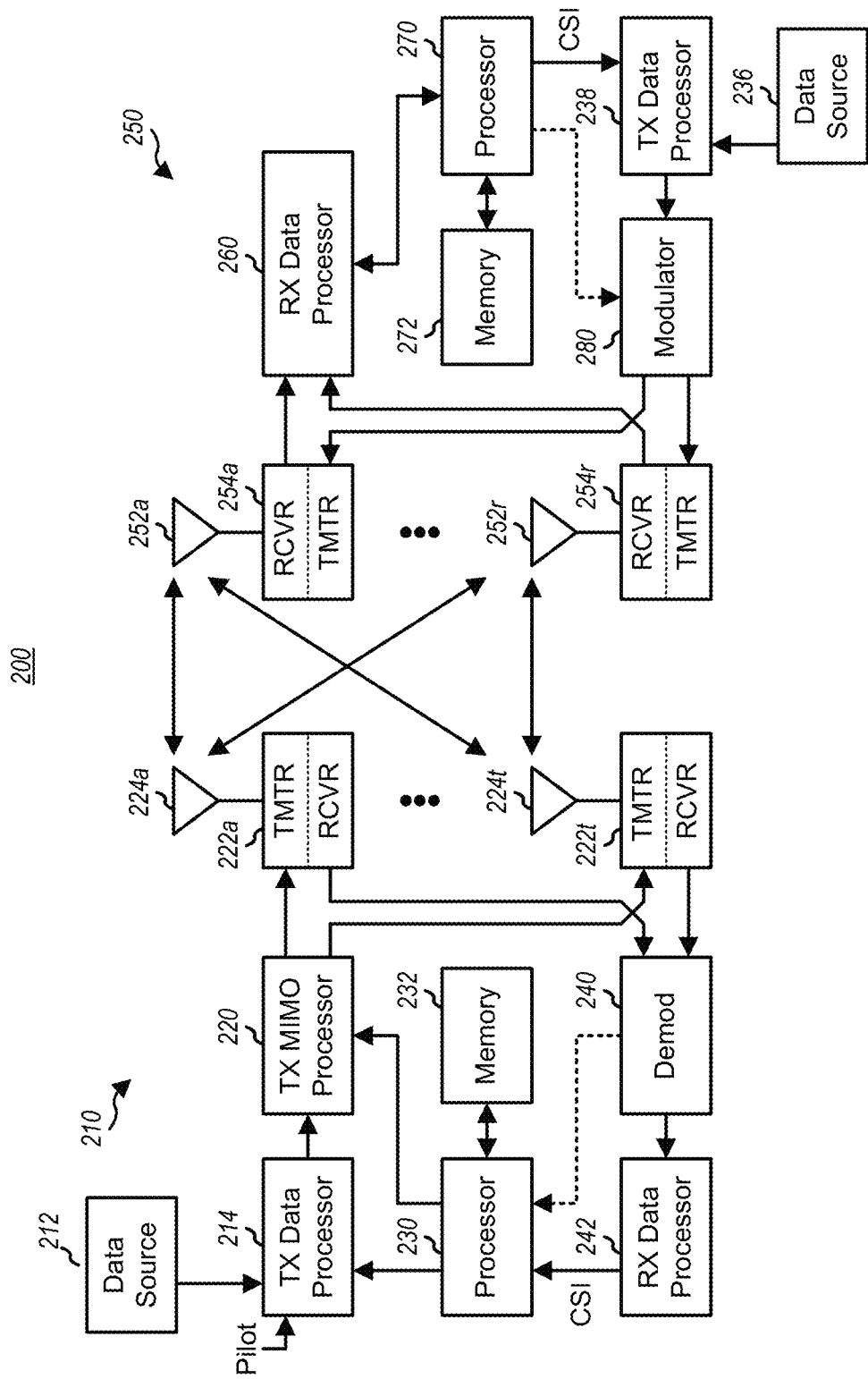
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
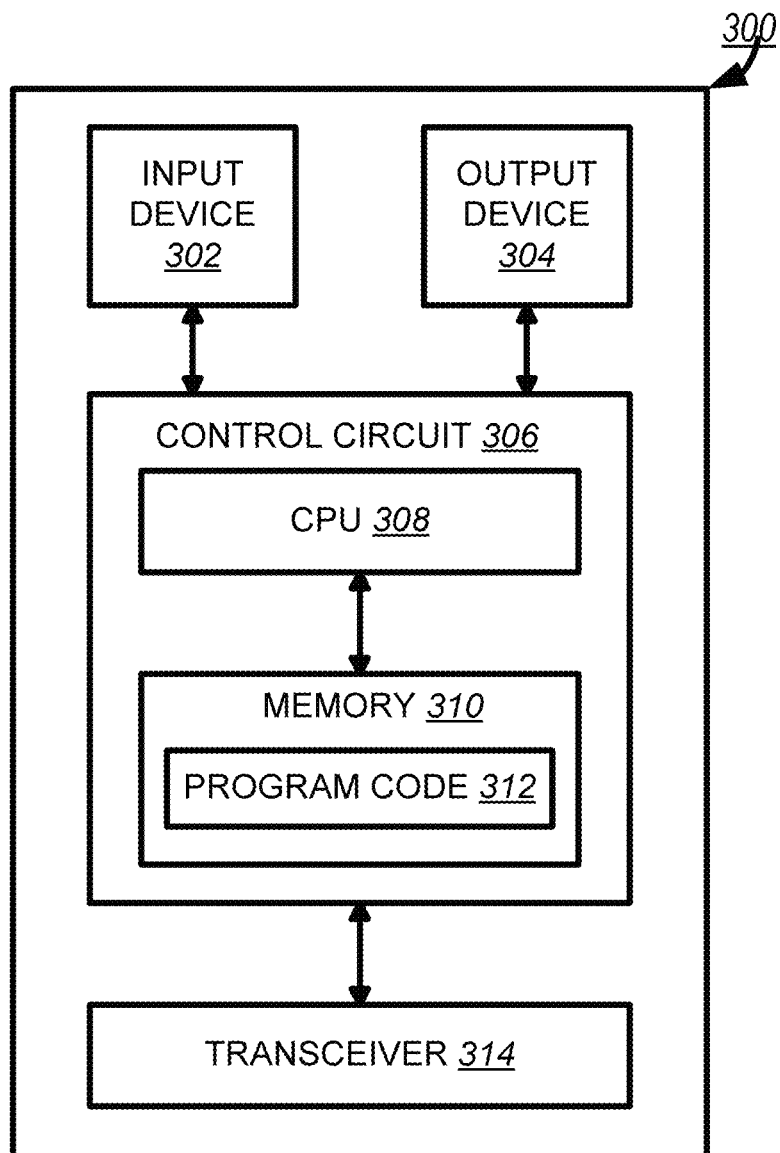
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
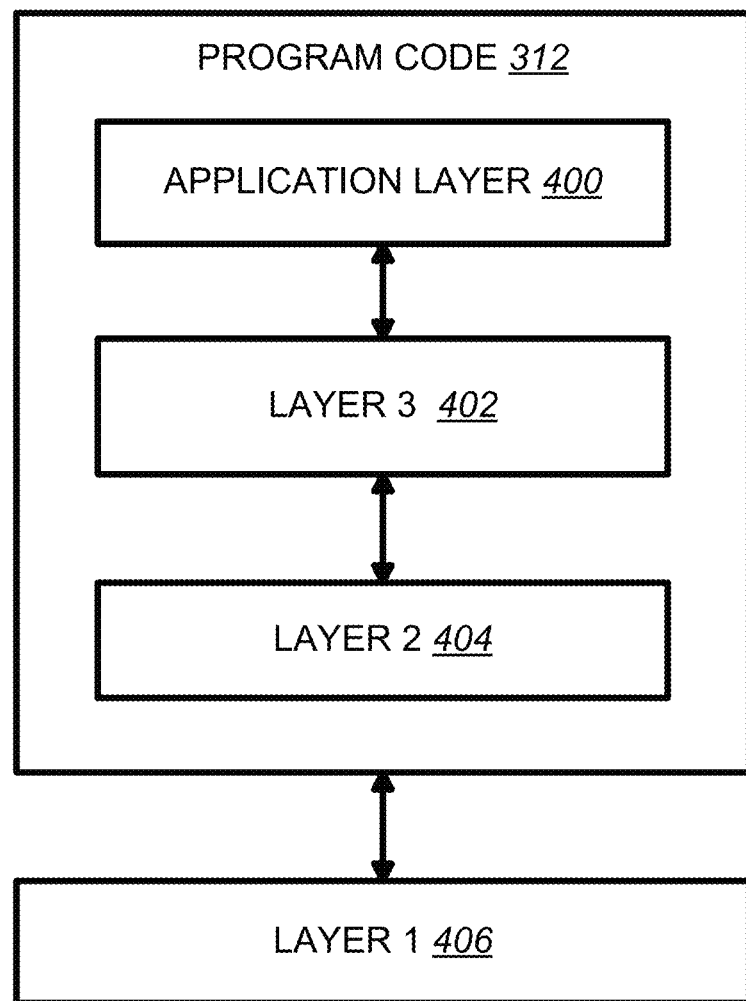
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g. current LTE bands <6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is a signal processing technique used in antenna arrays for directional signal transmission or reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 5A:
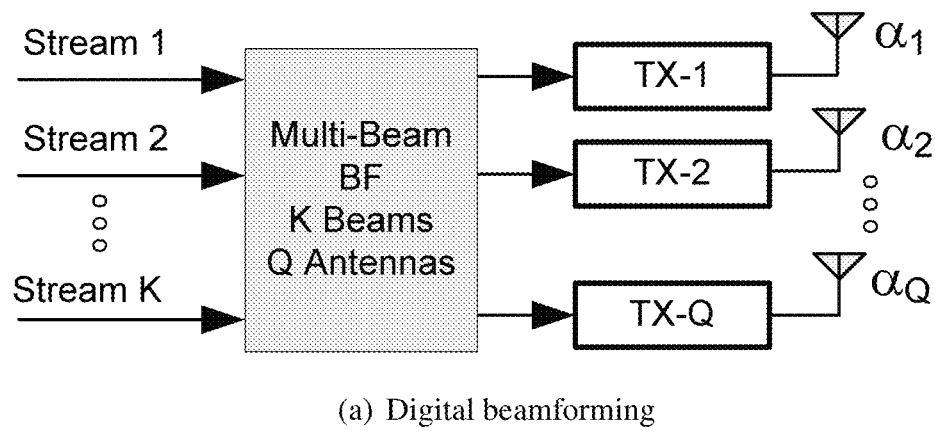
FIGS. 5A-5C provide exemplary illustrations of three types of beamforming.
Figure 5B:
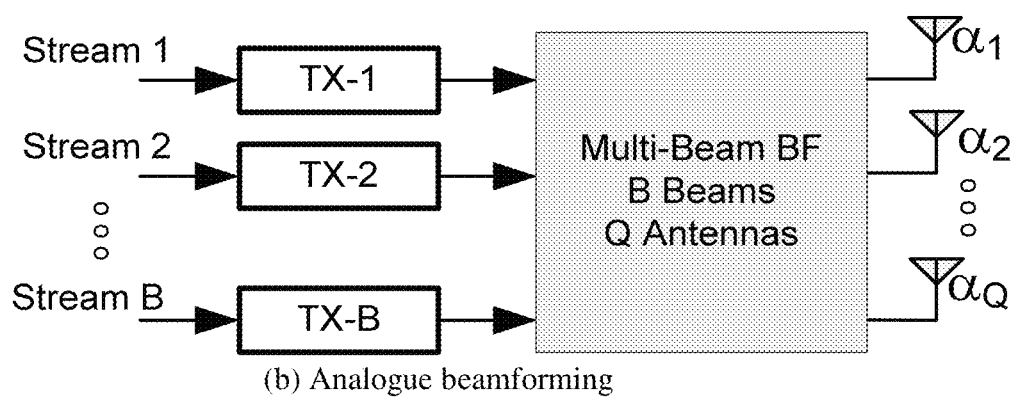
Figure 5C:
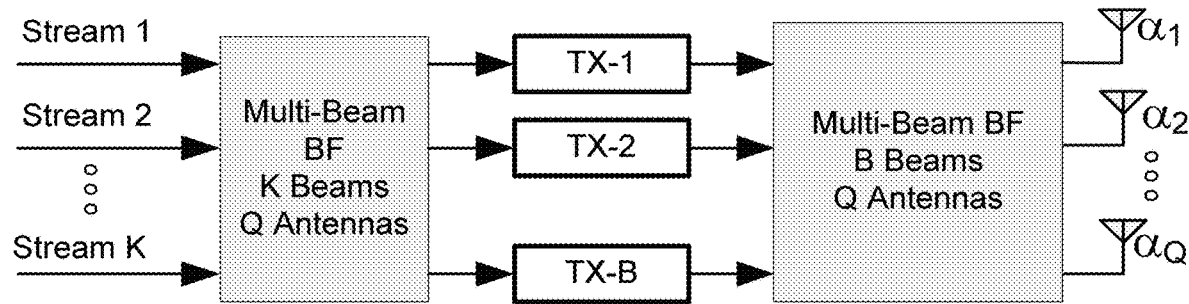
Figure 5C:
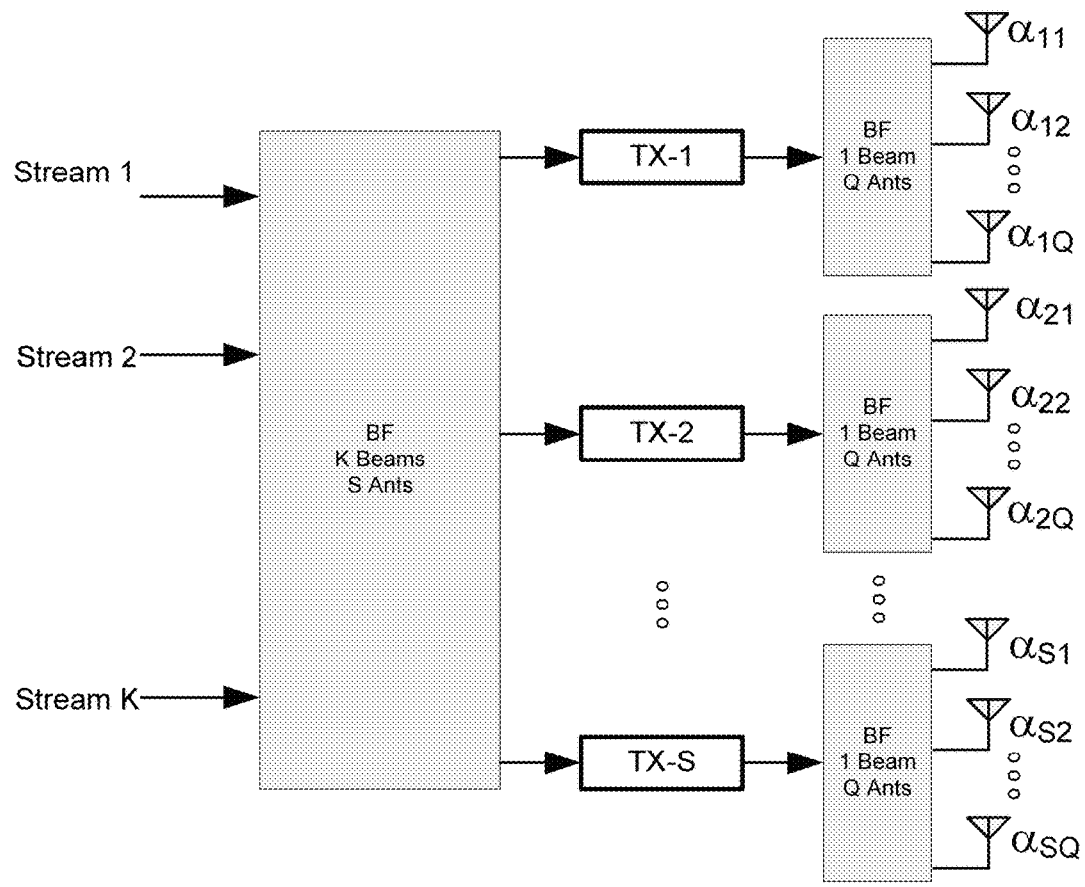

Beamforming can be categorized into three types of implementation: digital beamforming, hybrid beamforming, and analog beamforming. For digital beamforming, the beam is generated on the digital domain, i.e. the weighting of each antenna element can be controlled by baseband (e.g. connected to a TXRU). Therefore it is very easy to tune the beam direction of each subband differently across the system bandwidth. Also, to change beam direction from time to time does not require any switching time between Orthogonal Frequency Division Multiplexing (OFDM) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists). For Analog beamforming, the beam is generated on the analog domain, i.e. the weighting of each antenna element can be controlled by an amplitude or phase shifter in the Radio Frequency (RF) circuit. Since the weighing is purely controlled by the circuit, the same beam direction would apply on the whole system bandwidth. Also, if beam direction is to be changed, switching time is required. The number of beam generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain. The three types of beamforming are shown in FIGS. 5A-5C.

As discussed in 3GPP R2-162709, an eNB may have multiple TRPs (either centralized or distributed). Each TRP can form multiple beams. The number of beams and the number of simultaneous beams in the time/frequency domain depend on the number of antenna array elements and the RF at the TRP.

With the support of beam operation and TRP, a cell may have multiple choices to schedule a UE. For example, there may be multiple beams from a TRP transmitting the same data to the UE, which can provide more reliability for the transmission. Alternatively, multiple beams from multiple TRPs transmit the same data to the UE. To increase the throughput, it is also possible for a single TRP to transmit different data on different beams for the UE. Also, multiple TRPs can transmit different data on different beams to the UE.

To maintain the balance between the UL transmission performance and UE power consumption as well as interference mitigation, UE transmission power is properly controlled. The power may be controlled by some open loop parameter, e.g. the required received power, pathloss between UE and base station. It may also be controlled based on some close loop parameter, e.g. the power control command sent from the base station to the UE.

Power headroom report is provided by the UE to the base station to allow base station realize how much extra transmission power is available in the UE and how to schedule resource to the UE properly, e.g. is it proper to schedule more resource to the UE (e.g. UE has more power headroom). A power headroom may be calculated from the difference between a current calculated transmission UE power (if there is transmission) and a maximum transmission power of the UE. In some circumstances, e.g. multiple carrier operation, it is also possible that a power headroom is reported while there is no current transmission, e.g. reporting power headroom for a carrier without ongoing transmission with another carrier. In such a case, a difference between a reference power (calculated based on some reference parameter(s)) and a UE maximum power is reported as power headroom, as known as virtual power headroom (PH).

A UE maximum power mentioned above for power headroom derivation is determined by the capability of the UE and may also be controlled by the configuration of base station or cell. Also due to the linear range of power amplifier (PA) in UE's RF, the maximum power may be affected by the peak-to-average power ratio (PAPR) of the transmission. For example, if a transmission has a high PAPR, power back-off may be performed if the peak power would exceed the linear region when the average power is around the maximum power. A range of power back-off is allowed to balance the cost of UE PA and the UL transmission performance or coverage, which is known as maximum power reduction (MPR). Different modulation schemes (e.g. QPSK/16QAM) or different resource allocation (e.g. contiguous/non-contiguous or narrow band/wide band resource allocation) would result in different PAPR, and thus may have different MPRs. More details may be found in 3GPP TS 36.101 V14.1.0 as follows:

6.2.2 UE Maximum Output Power

The following UE Power Classes define the maximum output power for any transmission bandwidth within the channel bandwidth for non CA configuration and UL-MIMO unless otherwise stated. The period of measurement shall be at least one sub frame (1 ms).

[Table 6.2.2-1 of 3GPP TS 36.101 V14.1.0, entitled "UE Power Class", is reproduced as FIGS. 6A and 6B]

[ ... ]

6.2.5 Configured Transmitted Power

The UE is allowed to set its configured maximum output power $P_{CMAX,c}$ for serving cell c. The configured maximum output power $P_{CMAX,c}$ is set within the following bounds:

$$P_{CMAX\_L,c} \leq P_{CMAX,c} \leq P_{CMAX\_H,c} \text{ with}$$

$$P_{CMAX\_L,c}=\text{MIN}\{P_{EMAX,c}-\Delta T_{C,c}, P_{PowerClass}-\text{MAX}(MPR_c+A\text{-}MPR_c+\Delta T_{IB,c}+\Delta T_{C,c}+\Delta T_{ProSe}, P\text{-}MPR_c)\} P_{CMAX\_H,c}=\text{MIN}\{P_{EMAX,c}, P_{PowerClass}\}$$

where $P_{EMAX,c}$ is the value given by IE P-Max for serving cell c, defined in [7];

$P_{PowerClass}$ is the maximum UE power specified in Table 6.2.2-1 without taking into account the tolerance specified in the Table 6.2.2-1;

$MPR_c$ and $A\text{-}MPR_c$ for serving cell c are specified in subclause 6.2.3 and subclause 6.2.4, respectively;

$\Delta T_{IB,c}$ is the additional tolerance for serving cell c as specified in Table 6.2.5-2; $\Delta T_{IB,c}=0$ dB otherwise;

$\Delta T_{C,c}=1.5$ dB when NOTE 2 in Table 6.2.2-1 applies;

$\Delta T_c, =0$ dB when NOTE 2 in Table 6.2.2-1 does not apply;

$\Delta T_{Prose}=0.1$ dB when the UE supports ProSe Direct Discovery and/or ProSe Direct Communication on the corresponding E-UTRA ProSe band; $\Delta T_{ProSe}=0$ dB otherwise.

$P\text{-}MPR_c$ is the allowed maximum output power reduction for a) ensuring compliance with applicable electromagnetic energy absorption requirements and addressing unwanted emissions/self defense requirements in case of simultaneous transmissions on multiple RAT(s) for scenarios not in scope of 3GPP RAN specifications;

b) ensuring compliance with applicable electromagnetic energy absorption requirements in case of proximity detection is used to address such requirements that require a lower maximum output power.

The UE shall apply $P\text{-}MPR_c$ for serving cell c only for the above cases. For UE conducted conformance testing P-MPR shall be 0 dB NOTE 1: $P\text{-}MPR_c$ was introduced in the $P_{CMAX,c}$ equation such that the UE can report to the eNB the available maximum output transmit power. This information can be used by the eNB for scheduling decisions.

For each subframe, the $P_{CMAX\_L,c}$ for serving cell c is evaluated per slot and given by the minimum value taken over the transmission(s) within the slot; the minimum $P_{CMAX\_L,c}$ over the two slots is then applied for the entire subframe. $P_{PowerClass}$ shall not be exceeded by the UE during any period of time.

[ ... ]

6.2.5a Configured Transmitted Power for CA

For uplink carrier aggregation the UE is allowed to set its configured maximum output power $P_{CMAX,c}$ for serving cell c and its total configured maximum output power $P_{CMAX}$.

The configured maximum output power $P_{CMAX,c}$ on serving cell c shall be set as specified in subclause 6.2.5.

For uplink inter-band carrier aggregation, $MPR_c$ and $A\text{-}MPR_c$ apply per serving cell c and are specified in subclause 6.2.3 and subclause 6.2.4, respectively. $P\text{-}MPR_c$ accounts for power management for serving cell c. $P_{CMAX,c}$ is calculated under the assumption that the transmit power is increased independently on all component carriers.

For uplink intra-band contiguous and non-contiguous carrier aggregation, $MPR_c=MPR$ and $A\text{-}MPR_c=A\text{-}MPR$ with MPR and A-MPR specified in subclause 6.2.3A and subclause 6.2.4A respectively. There is one power management term for the UE, denoted P-MPR, and $P\text{-}MPR_c=P\text{-}MPR$. $P_{CMAX,c}$ is calculated under the assumption that the transmit power is increased by the same amount in dB on all component carriers.

The total configured maximum output power $P_{CMAX}$ shall be set within the following bounds:

$$P_{CMAX\_L} \leq P_{CMAX} < P_{CMAX\_H}$$

For uplink inter-band carrier aggregation with one serving cell c per operating band, $$P_{CMAX\_L}=\text{MIN}\{10 \log_{10}\Sigma\text{MIN}[p_{EMAX,c}/(\Delta t_{C,c}), p_{PowerClass}/(mpr_c \cdot a\text{-}mpr_c \cdot \Delta t_{C,c} \cdot \Delta t_{IB,c} \cdot \Delta t_{ProSe}), p_{PowerClass}/pmpr_c], P_{PowerClass}\}$$

$$P_{CMAX\_H}=\text{MIN}\{10 \log_{10}\Sigma p_{EMAX,c}, P_{PowerClass}\}$$

where $P_{EMAX,c}$ is the linear value of $P_{EMAX, c}$ which is given by IE P-Max for serving cell c in [7];

$P_{PowerClass}$ is the maximum UE power specified in Table 6.2.2A-1 without taking into account the tolerance specified in the Table 6.2.2A-1; $p_{PowerClass}$ is the linear value of $P_{PowerClass}$;

$mpr_c$ and $a\text{-}mpr_c$ are the linear values of $MPR_c$ and A-MPR c as specified in subclause 6.2.3 and subclause 6.2.4, respectively;

$pmpr_c$ is the linear value of $P\text{-}MPR_c$;

$\Delta t_{C,c}$ is the linear value of $\Delta T_{C,c}$ $\Delta t_{C,c}=1.41$ when NOTE 2 in Table 6.2.2-1 applies for a serving cell c, otherwise $\Delta t_{C,c}=1$;

$\Delta t_{IB,c}$ is the linear value of the inter-band relaxation term $\Delta T_{IB,c}$ of the serving cell c as specified in Table 6.2.5-2; otherwise $\Delta t_{IB,c}=1$;

$\Delta t_{ProSe}$ is the linear value of $\Delta T_{ProSe}$ and applies as specified in subclause 6.2.5.

Also, to avoid excessive reporting of power headroom, power headroom report would be triggered under some conditions, e.g. when the pathloss or power headroom value change a lot or the previously reporting is too far from now, e.g. a timer has expired since last report. More details can be found in 3GPP TS 36.321 V14.0.0 as follows:

5.4.6 Power Headroom Reporting

The Power Headroom reporting procedure is used to provide the serving eNB with information about the difference between the nominal UE maximum transmit power and the estimated power for UL-SCH transmission per activated Serving Cell and also with information about the difference between the nominal UE maximum power and the estimated power for UL-SCH and PUCCH transmission on SpCell and PUCCH SCell.

The reporting period, delay and mapping of Power Headroom are defined in subclause 9.1.8 of [9]. RRC controls Power Headroom reporting by configuring the two timers periodicPHR-Timer and prohibitPHR-Timer, and by signalling dl-PathlossChange which sets the change in measured downlink pathloss and the required power backoff due to power management (as allowed by P-MPR$_c$ [10]) to trigger a PHR [8].

A Power Headroom Report (PHR) shall be triggered if any of the following events occur:

prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;

periodicPHR-Timer expires;

upon configuration or reconfiguration of the power headroom reporting functionality by upper layers [8], which is not used to disable the function;

activation of an SCell of any MAC entity with configured uplink;

addition of the PSCell;

prohibitPHR-Timer expires or has expired, when the MAC entity has UL resources for new transmission, and the following is true in this TTI for any of the activated Serving Cells of any MAC entity with configured uplink:

there are UL resources allocated for transmission or there is a PUCCH transmission on this cell, and the required power backoff due to power management (as allowed by P-MPR$_c$ [10]) for this cell has changed more than dl-PathlossChange dB since the last transmission of a PHR when the MAC entity had UL resources allocated for transmission or PUCCH transmission on this cell.

NOTE: The MAC entity should avoid triggering a PHR when the required power backoff due to power management decreases only temporarily (e.g. for up to a few tens of milliseconds) and it should avoid reflecting such temporary decrease in the values of $P_{CMAX,c}$/PH when a PHR is triggered by other triggering conditions.

If the MAC entity has UL resources allocated for new transmission for this TTI the MAC entity shall:

if it is the first UL resource allocated for a new transmission since the last MAC reset, start periodicPHR-Timer;

if the Power Headroom reporting procedure determines that at least one PHR has been triggered and not cancelled, and;

if the allocated UL resources can accommodate the MAC control element for PHR which the MAC entity is configured to transmit, plus its subheader, as a result of logical channel prioritization:

if extendedPHR is configured:

for each activated Serving Cell with configured uplink:

obtain the value of the Type 1 power headroom;

if the MAC entity has UL resources allocated for transmission on this Serving Cell for this TTI:

obtain the value for the corresponding $P_{CMAX,c}$ field from the physical layer;

if simultaneousPUCCH-PUSCH is configured:

obtain the value of the Type 2 power headroom for the PCell;

obtain the value for the corresponding $P_{CMAX,c}$ field from the physical layer (see subclause 5.1.1.2 of [2]);

instruct the Multiplexing and Assembly procedure to generate and transmit an Extended PHR MAC control element for extendedPHR as defined in subclause 6.1.3.6a based on the values reported by the physical layer;

else if extendedPHR2 is configured:

for each activated Serving Cell with configured uplink:

obtain the value of the Type 1 power headroom;

if the MAC entity has UL resources allocated for transmission on this Serving Cell for this TTI:

obtain the value for the corresponding $P_{CMAX,c}$ field from the physical layer;

if a PUCCH SCell is configured and activated:

obtain the value of the Type 2 power headroom for the PCell and PUCCH SCell;

obtain the values for the corresponding $P_{CMAX,c}$ fields from the physical layer (see subclause 5.1.1.2 of [2]);

else:

if simultaneousPUCCH-PUSCH is configured for the PCell:

obtain the value of the Type 2 power headroom for the PCell;

obtain the value for the corresponding $P_{CMAX,c}$ field from the physical layer (see subclause 5.1.1.2 of [2]);

instruct the Multiplexing and Assembly procedure to generate and transmit an Extended PHR MAC control element for extendedPHR2 according to configured ServCellIndex and the PUCCH(s) for the MAC entity as defined in subclause 6.1.3.6a based on the values reported by the physical layer;

else if dualConnectivityPHR is configured:

for each activated Serving Cell with configured uplink associated with any MAC entity:

obtain the value of the Type 1 power headroom;

if this MAC entity has UL resources allocated for transmission on this Serving Cell for this TTI or if the other MAC entity has UL resources allocated for transmission on this Serving Cell for this TTI and phr-ModeOtherCG is set to real by upper layers:

obtain the value for the corresponding $P_{CMAX,c}$ field from the physical layer;

if simultaneousPUCCH-PUSCH is configured:
  obtain the value of the Type 2 power headroom for the SpCell;
  obtain the value for the corresponding $P_{CMAX,c}$ field for the SpCell from the physical layer (see subclause 5.1.1.2 of [2]);
  obtain the value of the Type 2 power headroom for the SpCell of the other MAC entity;
  if phr-ModeOtherCG is set to real by upper layers:
    obtain the value for the corresponding $P_{CMAX,c}$ field for the SpCell of the other MAC entity from the physical layer (see subclause 5.1.1.2 of [2]);
  instruct the Multiplexing and Assembly procedure to generate and transmit a Dual Connectivity PHR MAC control element as defined in subclause 6.1.3.6b based on the values reported by the physical layer;
else:
  obtain the value of the Type 1 power headroom from the physical layer;
  instruct the Multiplexing and Assembly procedure to generate and transmit a PHR MAC control element as defined in subclause 6.1.3.6 based on the value reported by the physical layer;
start or restart periodicPHR-Timer;
start or restart prohibitPHR-Timer;
cancel all triggered PHR(s).
[ . . . ]

6.1.3.6 Power Headroom Report MAC Control Element

The Power Headroom Report (PHR) MAC control element is identified by a MAC PDU subheader with LCID as specified in table 6.2.1-2. It has a fixed size and consists of a single octet defined as follows (FIG. 6.1.3.6-1):

R: reserved bit, set to "0";
Power Headroom (PH): this field indicates the power headroom level. The length of the field is 6 bits. The reported PH and the corresponding power headroom levels are shown in Table 6.1.3.6-1 below (the corresponding measured values in dB can be found in subclause 9.1.8.4 of [9]).

Figures 7, 8:
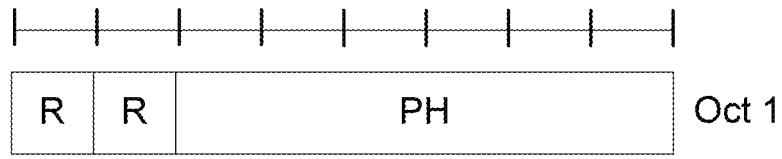
FIG. 7 is a reproduction of FIG. 6.1.3.6-1 of 3GPP TS 36.321 V14.0.0.
FIG. 8 is a reproduction of Table 6.1.3.6-1 of 3GPP TS 36.321 V14.0.0.

FIG. 6.1.3.6-1 of 3GPP TS 36.321 V14.0.0, Entitled "PHR MAC Control Element", is Reproduced as FIG. 7

Table 6.1.3.6-1 of 3GPP TS 36.321 V14.0.0, Entitled "Power Headroom Levels for PHR", is Reproduced as FIG. 8

6.1.3.6a Extended Power Headroom Report MAC Control Elements

For extendedPHR, the Extended Power Headroom Report (PHR) MAC control element is identified by a MAC PDU subheader with LCID as specified in table 6.2.1-2. It has a variable size and is defined in FIG. 6.1.3.6a-2. When Type 2 PH is reported, the octet containing the Type 2 PH field is included first after the octet indicating the presence of PH per SCell and followed by an octet containing the associated $P_{CMAX,c}$ field (if reported). Then follows in ascending order based on the ServCellIndex [8] an octet with the Type 1 PH field and an octet with the associated $P_{CMAX,c}$ field (if reported), for the PCell and for each SCell indicated in the bitmap.

For extendedPHR2, the Extended Power Headroom Report (PHR) MAC control elements are identified by a MAC PDU subheader with LCID as specified in table 6.2.1-2. They have variable sizes and are defined in FIG. 6.1.3.6a-3, FIG. 6.1.3.6a-4 and FIG. 6.1.3.6a-5. One octet with C fields is used for indicating the presence of PH per SCell when the highest SCellIndex of SCell with configured uplink is less than 8, otherwise four octets are used. When Type 2 PH is reported for the PCell, the octet containing the Type 2 PH field is included first after the octet(s) indicating the presence of PH per SCell and followed by an octet containing the associated $P_{CMAX,c}$ field (if reported). Then follows the Type 2 PH field for the PUCCH SCell (if PUCCH on SCell is configured and Type 2 PH is reported for the PUCCH SCell), followed by an octet containing the associated $P_{CMAX,c}$ field (if reported). Then follows in ascending order based on the ServCellIndex [8] an octet with the Type 1 PH field and an octet with the associated $P_{CMAX,c}$ field (if reported), for the PCell and for each SCell indicated in the bitmap.

The Extended PHR MAC Control Elements are defined as follows:

$C_i$: this field indicates the presence of a PH field for the SCell with SCellIndex i as specified in [8]. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;

Power Headroom (PH): this field indicates the power headroom level. The length of the field is 6 bits. The reported PH and the corresponding power headroom levels are shown in Table 6.1.3.6-1 (the corresponding measured values in dB can be found in subclause 9.1.8.4 of [9]);

P: this field indicates whether the MAC entity applies power backoff due to power management (as allowed by P-MPR$_c$ [10]). The MAC entity shall set P=1 if the corresponding $P_{CMAX,c}$ field would have had a different value if no power backoff due to power management had been applied;

$P_{CMAX,c}$: if present, this field indicates the $P_{CMAX,c}$ or $\tilde{P}_{CMAX,c}$ [2] used for calculation of the preceding PH field. The reported $P_{CMAX,c}$ and the corresponding nominal UE transmit power levels are shown in Table 6.1.3.6a-1 (the corresponding measured values in dBm can be found in subclause 9.6.1 of [9]).

FIG. 6.1.3.6a-2 of 3GPP TS 36.321 V14.0.0, Entitled "Extended PHR MAC Control Element", is Reproduced as FIG. 9

FIG. 6.1.3.6a1-3 of 3GPP TS 36.321 V14.0.0, Entitled "Extended PHR MAC Control Element Supporting PUCCH on Scell", is Reproduced as FIG. 10

FIG. 6.1.3.6a2-4 of 3GPP TS 36.321 V14.0.0, Entitled "Extended PHR MAC Control Element Supporting 32 Serving Cells with Configured Uplink", is Reproduced as FIG. 11

Figure 12:
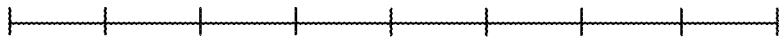
FIG. 12 is a reproduction of FIG. 6.1.3.6a3-5 of 3GPP TS 36.321 V14.0.0.

FIG. 6.1.3.6a3-5 of 3GPP TS 36.321 V14.0.0, Entitled "Extended PHR MAC Control Element Supporting 32 Serving Cells with Configured Uplink and PUCCH on Scell", is Reproduced as FIG. 12

Table 6.1.3.6a-1 of 3GPP TS 36.321 V14.0.0, Entitled "Nominal UE Transmit Power Level for Extended PHR and for Dual Connectivity PHR", is Reproduced as FIG. 13

Multiple pathloss references are introduced to facilitate power control for beam operation. Multiple reference signals can be configured for a UE as pathloss reference candidate. A base station could transmit different reference signals (on different beams or for different sounding reference signal resource index (SRI) or with different spatial precoder), such that pathloss for a beam or a SRI or a spatial precoder could be reflected by measuring a reference signal associated with the beam or SRI o spatial precoder. With properly compensation of different pathloss for different transmission [on different beam or with different SRI or with different spatial precoder], per beam, SRI, or spatial precoder power control can be achieved with properly setting different transmission powers for transmissions on different beams or differet SRIs or different spatial precdoder.

Note that in this application, beam, SRI, and precoder could mean the same thing and could be used inter-changeably.

Which pathloss reference is used for deriving pathloss value for power control or power headroom derivation could be indicated by a base station for a transmission. For example, each value of SRI would be associated with a pathloss reference via RRC configuration and pathloss reference for a PUSCH (Physical Uplink Shared Channel) could be selected or used for power control according to a SRI field in a DCI (Downlink Control Information) format scheduling the PUSCH transmission, e.g a pathloss reference associated with the SRI is selected or used. When such SRI is not indicated (e.g. if the DCI dose not comprise SRI or the is no DCI for a PUSCH, e.g. grant-free transmission or transmission with configured UL grant), or there is no PUSCH transmitted while virtual power headroom for a cell, some rule would be defined for determining a pathloss reference, by a UE or a base station. More details can be found in the following discussions.

In RAN1#89, RAN1 recognizes the necessity to take into account the pathloss differences among different beams in power control and made the following agreement:

Agreements:
Support beam specific pathloss for ULPC
In RAN1#90bis meeting, details of implementing the above agreement were agreed in RAN1 by defining a power control formula with addition of pathloss reference indication:
Agreement
Support the following PUSCH power control in NR:

$$P_{PUSCH,c}(i) = \min \left\{ \begin{array}{l} P_{CMAX,c}(i), \\ 10\log_{10}(M_{PUSCH,c}(i)) + P_{0,c}(j) + \alpha_c(j) \cdot \\ PL_c(k) + \Delta_{TF,c}(i) + f_c(i, l) \end{array} \right\}$$

For the pathloss measurement RS indication.
  k is indicated by beam indication for PUSCH (if present)
    A linkage between PUSCH beam indication and k which is index of downlink RS resource for PL measurement is pre-configured via high layer signal
  Only one value k is RRC configured in UE specific way if PUSCH beam indication is not present
In RAN1#91, RAN1 further clarifies beam indication for PUSCH is equivalent to SRI field in UL grant and it was agreed to configure up to 4 pathloss reference:
Agreement:
For PUSCH PC, when SRI field is configured, confirm the agreed expression of "PUSCH beam indication (if present)" is the same as "indication by SRI field in UL grant (if present)", aligning to MIMO agreements at least for grant-based PUSCH.
FFS: The case where SRI field is not configured
Agreement:
The maximum total number of PL estimates for PUSCH, PUCCH, and SRS that can be configured to a UE is limited to 4 per cell
In RAN1#1801Adhoc, RAN1 agreed mapping between value in SRI field and pathloss reference are configured by RRC for grant based PUSCH. For configured grant type 1 PUSCH, pathloss reference is directly configured by RRC. For configured grant type 2 PUSCH:
Agreement:
Define RRC parameter SRI-PUSCHPowerControl-Mapping which contains the following, where Ns is the number of valid values for the SRI field in the DCI (as defined in 38.212)
SRI-PathlossReferenceIndex-Mapping contains Ns pathloss reference ID values (Note: Maximum of four pathloss reference IDs can be configured) with the first value corresponding to SRI state 0, second value corresponding to SRI state 1 etc.
Agreement:
Add RRC parameter PathlossReferenceIndex at least for UL-TWG-type1
In RAN1#92, RAN1 agreed pathloss reference would be indicated by activation DCI for configured grant type 2 PUSCH:
Agreement:
For the indication of {k} for PUSCH UL-TWG-type2:
Do NOT introduce one new RRC parameter PathlossReferenceIndex into UL-TWG-type2 and the pathloss reference index will be based on activation DCI for UL-TWG-type2
In RAN1#92 bis, RAN1 agreed there would be default pathloss reference for the case of virtual PHR and Msg3:

Agreement

Default parameter setting for virtual PHR

How to set {j, $q_d$, l}
- For j, P0alphasetindex=0 of p0-pusch-alpha-setconfig
- For $q_d$, pusch-pathlossreference-index=0 of pusch-pathloss-Reference-rs
- For l, l=0
- Note: If the UE is configured with multiple UL BWPs, j, qd, l corresponding to lowest BWP ID are used Agreement For PUSCH Msg3 in the RRC_CONNECTED state, UE shall use the SSB or CSI-RS associated with the PRACH for the pathloss measurement More detail could be found in 3GPP R1-1805795 as follows:

7 Uplink Power Control

Uplink power control determines the transmit power of the different uplink physical channels or signals.

7.1 Physical Uplink Shared Channel

For PUSCH, a UE first scales a linear value $\hat{P}_{PUSCH,b,f,c}$ (i,j,$q_d$,l) of the transmit power $P_{PUSCH,b,f,c}$(i,j,$q_d$,l) on UL BWP b, as described in Subclause 12, of carrier f of serving cell c, with parameters as defined in Subclause 7.1.1, by the ratio of the number of antenna ports with a non-zero PUSCH transmission to the number of configured antenna ports for the transmission scheme. The resulting scaled power is then split equally across the antenna ports on which the non-zero PUSCH is transmitted. The UL BWP b is the active UL BWP.

7.1.1 UE Behaviour

If a UE transmits a PUSCH on UL BWP b of carrier f of serving cell c using parameter set configuration with index j and PUSCH power control adjustment state with index l, the UE determines the PUSCH transmission power $P_{PUSCH,b,f,c}$(i,j,$q_d$,l) in PUSCH transmission period i as $$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{cases} [dBm]$$

where, $P_{CMAX,f,c}$(i) is the configured UE transmit power defined in [8-1, TS 38.101-1] and [8-2, TS38.101-2] for carrier f of serving cell c in PUSCH transmission period i.

$P_{O\_PUSCH,b,f,c}$(j) is a parameter composed of the sum of a component $P_{O\_NOMINAL\_PUSCH,f,c}$(j) and a component $P_{O\_UE\_PUSCH,b,f,c}$(j) where j∈{0, 1, . . . , J−1}.

If a UE is not provided with higher layer parameter P0-PUSCH-AlphaSet or for a Msg3 PUSCH transmission as described in Subclause 8.3, j=0, $P_{O\_UE\_PUSCH,b,f,c}$(0)=0, and $P_{O\_NOMINAL\_PUSCH,f,c}$(0)=$P_{O\_PRE}$+$\Delta_{PREAMBLE\_Msg3}$, where the parameter preambleReceivedTargetPower [11, TS 38.321] (for $P_{O\_PRE}$) and msg3-DeltaPreamble (for $\Delta_{PREAMBLE\_Msg3}$) are provided by higher layers for carrier f of serving cell c.

For a PUSCH (re)transmission configured by higher layer parameter ConfiguredGrantConfig, j=1, $P_{O\_NOMINAL\_PUSCH,f,c}$(1) is provided by higher layer parameter p0-NominalWithoutGrant, and $P_{O\_UE\_PUSCH,b,f,c}$(1) is provided by higher layer parameter p0 obtained from p0-PUSCH-Alpha in ConfiguredGrantConfig that provides an index P0-PUSCH-AlphaSetId to a set of higher layer parameters P0-PUSCH-AlphaSet for UL BWP b of carrier f of serving cell c.

For j∈{2, . . . , J−1}=$S_J$, a $P_{O\_NOMINAL\_PUSCH,f,c}$(j) value, applicable for all j∈$S_J$, is provided by higher layer parameter p0-NominalWithGrant for each carrier f of serving cell c and a set of $P_{O\_UE\_PUSCH,b,f,c}$(j) values are provided by a set of higher layer parameters p0 in P0-PUSCH-AlphaSet indicated by a respective set of higher layer parameters p0-PUSCH-AlphaSetId for UL BWP b of carrier f of serving cell c If the UE is provided by higher layer parameter SRI-PUSCH-PowerControl more than one values of p0-PUSCH-AlphaSetId and if DCI format 0_1 includes a SRI field, the UE obtains a mapping from higher layer parameter sri-PUSCH-PowerControlld in SRI-PUSCH-PowerControl between a set of values for the SRI field in DCI format 0_1 [5, TS 38.212] and a set of indexes provided by higher layer parameter p0-PUSCH-AlphaSetId that map to a set of P0-PUSCH-AlphaSet values. If the PUSCH transmission is scheduled by a DCI format 0_1, the UE determines the values of $P_{O\_UE\_PUSCH,b,f,c}$(j) from the p0alphasetindex value that is mapped to the SRI field value.—If the PUSCH transmission is scheduled by a DCI format 0_0 or by a DCI format 0_1 that does not include a SRI field, or if a higher layer parameter SRI-P0AlphaSetIndex-Mapping is not provided to the UE, the UE determines $P_{O\_UE\_PUSCH,b,f,c}$(j) from the first p0-pusch-alpha-set in p0-pusch-alpha-setconfig for all j∈$S_J$.

For $\alpha_{b,f,c}$(j)

For j=0, $\alpha_{b,f,c}$(0) is a value of higher layer parameter msg3-Alpha, when provided; otherwise, $\alpha_{b,f,c}$(0)=1.

For j=1, $\alpha_{b,f,c}$(1) is provided by higher layer parameter alpha obtained from p0-PUSCH-Alpha in ConfiguredGrantConfig providing an index P0-PUSCH-AlphaSetId to a set of higher layer parameters P0-PUSCH-AlphaSet for UL BWP b of carrier f of serving cell c.

For j∈$S_J$, a set of $\alpha_{b,f,c}$(j) values are provided by a set of higher layer parameters p0-NominalWithGrant for each carrier f of serving cell c and a set of the UE does not accumulate corresponding values are provided by a set of higher layer parameters alpha in P0-PUSCH-AlphaSet indicated by a respective set of higher layer parameters p0-PUSCH-AlphaSetId for UL BWP b of carrier f of serving cell c.

If the UE is provided a higher layer parameter SRI-PUSCH-PowerControl and more than one values of p0-PUSCH-AlphaSetId, DCI format 0_1 includes a SRI field and the UE obtains a mapping from higher layer parameter sri-PUSCH-PowerControlld in SRI-PUSCH-PowerControl between a set of values for the SRI field in DCI format 0_1 [5, TS 38.212] and a set of indexes provided by higher layer parameter p0-PUSCH-AlphaSetId that map to a set of P0-PUSCH-AlphaSetvalues. If the PUSCH transmission is scheduled by a DCI format 0_1, the UE determines the values of $\alpha_{b,f,c}$(j) from the p0alphasetindex value that is mapped to the SRI field value.

If the PUSCH transmission is scheduled by a DCI format 0_0 or by a DCI format 0_1 that does not include a SRI field, or if a higher layer parameter SRI-P0AlphaSetIndex-Mapping is not provided to the UE, the UE determines $\alpha_{b,f,c}(j)$ from the first p0-pusch-alpha-set in p0-pusch-alpha-setconfig for all $j \in S_J$.

$M_{RB,b,f,c}^{PUSCH}(i)$ is the bandwidth of the PUSCH resource assignment expressed in number of resource blocks for PUSCH transmission period i on UL BWP b of carrier f of serving cell c and $\mu$ is defined in [4, TS 38.211].

$PL_{b,f,c}(q_d)$ is a downlink path-loss estimate in dB calculated by the UE using reference signal (RS) index $q_d$ for a DL BWP that is paired with UL BWP b of carrier f of serving cell C.

If the UE is not provided with higher layer parameter PUSCH-PathlossReferenceRS and before the UE is provided with dedicated higher layer parameters, the UE identifies a RS index from the SS/PBCH block index that the UE obtains higher layer parameter MasterinformationBiock.

If the UE is configured with a number of RS resource indexes up to the value of higher layer parameter maxNrofPUSCH-PathlossReferenceRSs and a respective set of RS configurations for the number of RS resource indexes by higher layer parameter PUSCH-PathlossReferenceRS. The set of RS resource indexes can include one or both of a set of SS/PBCH block indexes, each provided by higher layer parameter ssb-Index when a value of a corresponding higher layer parameter pusch-PathlossReferenceRS-Id maps to a SS/PBCH block index, and a set of CSI-RS resource indexes, each provided by higher layer parameter csi-RS-Index when a value of a corresponding higher layer parameter pusch-PathlossReferenceRS-Id maps to a CSI-RS resource index. The UE identifies a RS resource index in the set of RS resource indexes to correspond either to a SS/PBCH block index or to a CSI-RS resource index as provided by higher layer parameter pusch-PathlossReferenceRS-Id in PUSCH-PathlossReferenceRS.

If the PUSCH is an Msg3 PUSCH, the UE uses the same RS resource index as for a corresponding PRACH transmission.

If the UE is provided a higher layer parameter SRI-PUSCH-PowerControl and more than one values of PUSCH-PathlossReferenceRS-Id, the UE obtains a mapping from higher layer parameter sri-PUSCH-PowerControlld in SRI-PUSCH-PowerControl between a set of values for the SRI field in DCI format 0_1 and a set of PUSCH-PathlossReferenceRS-Id values. If the PUSCH transmission is scheduled by a DCI format 0_1, DCI format 0_1 includes a SRI field and the UE determines the RS resource $q_d$ from the value of pusch-pathlossreference-index that is mapped to the SRI field value.

If the PUSCH transmission is scheduled by a DCI format 0_0 or by a DCI format 0_1 that does not include a SRI field, or if a higher layer parameter SRI-PathlossReferenceIndex-Mapping is not provided to the UE, the UE determines a RS resource with a respective higher layer parameter pusch-pathlossreference-index value being equal to zero.

For a PUSCH transmission configured by higher layer parameter ConfiguredGrantConfig, if higher layer parameter rrc-ConfiguredUplinkGrant in ConfiguredGrantConfig includes higher layer parameter pathlossReferenceIndex, a RS resource index $q_d$ is provided by a value of higher layer parameter pathlossReferenceIndex.

For a PUSCH transmission configured by higher layer parameter ConfiguredGrantConfig, if higher layer parameter rrc-ConfiguredUplinkGrant in ConfiguredGrantConfig does not include higher layer parameter pathlossReferenceIndex, the UE determines the RS resource $q_d$ from the value of PUSCH-PathlossReferenceRS-Id that is mapped to the SRI field value in the DCI format activating the PUSCH transmission. If the DCI format activating the PUSCH transmission does not include a SRI field, the UE determines a RS resource with a respective higher layer parameter PUSCH-PathlossReferenceRS-Id value being equal to zero.

$PL_{b,f,c}(q_d)$=referenceSigna/Power—higher layer filtered RSRP, where referenceSigna/Power is provided by higher layers and RSRP is defined in [7, TS 38.215] for the reference serving cell and the higher layer filter configuration is defined in [12, TS 38.331] for the reference serving cell.

For j=0, referenceSigna/Power is provided by higher layer parameter ss-PBCH-BlockPower. For j>0, referenceSigna/Power is configured by either higher layer parameter ss-PBCH-BlockPower or, when periodic CSI-RS transmission is configured, by higher layer parameter powerControlOffsetSS providing an offset of the CSI-RS transmission power relative to the SS/PBCH block transmission power [6, TS 38.214].

$\Delta_{TF,b,f,c}(i) = 10 \log_{10}((2^{BPREK}-1) \cdot \beta_{offset}^{PUSCH})$ for $K_S=1.25$ and $\Delta_{TF,b,f,c}(i)=0$ for $K_S=0$ where $K_S$ is provided by higher layer parameter deltaMCS provided for each UL BWP b of each carrier f and serving cell c. If the PUSCH transmission is over more than one layer [6, TS 38.214], $\Delta_{TF,b,f,c}(i)=0$. BPRE and $\beta_{offset}^{PUSCH}$, for each UL BWP b of each carrier f and each serving cell c, are computed as below.

$$BPRE = \sum_{r=0}^{C-1} K_r / N_{RE}$$

for PUSCH with UL-SCH data and $BPRE = O_{CSI}/N_{RE}$ for CSI transmission in a PUSCH without UL-SCH data, where C is the number of code blocks, $K_r$ is the size for code block r, $O_{CSI}$ is the number of CSI part 1 bits including CRC bits, and $N_{RE}$ is the number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j),$$

where $N_{symb,b,f,c}^{PUSCH}(i)$ is the number of symbols for PUSCH transmission period i on UL BWP b of carrier f of serving cell c, $N_{sc,data}^{RB}(i,j)$ is a number of subcarriers excluding DM-RS subcarriers in PUSCH symbol j, $0 \leq j < N_{symb,b,f,c}^{PUSCH}(i)$, and C, $K_r$ are defined in [5, TS 38.212].

$\beta_{offset}^{PUSCH}=1$ when the PUSCH includes UL-SCH data and $\beta_{offset}^{PUSCH}=\beta_{offset}^{CSI,1}$, as described in Subclause 9.3, when the PUSCH includes CSI and does not include UL-SCH data.

For the PUSCH power control adjustment state for UL BWP b of carrier f of serving cell c in PUSCH transmission period i $\delta_{PUSCH,b,f,c}(i-K_{PUSCH},l)$ is a correction value, also referred to as a TPC command, and is included in a DCI format 0_0 or DCI format 0_1 that schedules the PUSCH transmission period i on UL BWP b of carrier f of serving cell c or jointly coded with other TPC commands in a DCI format 2_2 having CRC parity bits scrambled by TPC-PUSCH-RNTI, as described in Subclause 11.3, that is last received by the UE prior to the PUSCH transmission;

$l \in \{0, 1\}$ if the UE is configured with higher layer parameter twoPUSCH-PC-AdjustmentStates, and l==0 if the UE is not configured with higher layer parameter twoPUSCH-PC-AdjustmentStates or if the PUSCH is a Msg3 PUSCH.

For a PUSCH (re)transmission configured by higher layer parameter ConfiguredGrantConfig, the value of $l \in \{0,1\}$ is provided to the UE by higher layer parameter powerControlLoop-ToUse If the UE is provided a higher layer parameter SRI-PUSCH-PowerControl, the UE obtains a mapping between a set of values for the SRI field in DCI format 0_1 and the l value(s) provided by higher layer parameter sri-PUSCH-ClosedLoopIndex. If the PUSCH transmission is scheduled by a DCI format 0_1 and if DCI format 0_1 includes a SRI field, the UE determines the l value that is mapped to the SRI field value If the PUSCH transmission is scheduled by a DCI format 0_0 or by a DCI format 0_1 that does not include a SRI field, or if a higher layer parameter SRI-PUSCH-PowerControl is not provided to the UE, l=0

$f_{b,f,c}(i,l)+f_{b,f,c}(i-1,l)+\delta_{PUSCH,b,f,c}(i-K_{PUSCH},l)$ is the PUSCH power control adjustment state for UL BWP b of carrier f of serving cell c and PUSCH transmission period i if accumulation is enabled based on higher layer parameter tpc-Accumulation, where $\delta_{PUSCH,b,f,c}(i-K_{PUSCH},l)=0$ dB if the UE does not detect a TPC command for UL BWP b of carrier f of serving cell c.

If the PUSCH transmission is in response to a PDCCH decoding with DCI format 0_0 or DCI format 0_1, or 2_2 having CRC parity bits scrambled by TPC-PUSCH-RNTI, the respective $\delta_{PUSCH,b,f,c}$ accumulated values are given in Table 7.1.1-1.

If the UE has reached $P_{CMAX,f,c}(i)$ for UL BWP b of carrier f of serving cell c, the UE does not accumulate positive TPC commands for UL BWP b of carrier f of serving cell c.

If UE has reached minimum power for UL BWP b of carrier f of serving cell c, the UE does not accumulate negative TPC commands for UL BWP b of carrier f of serving cell c.

A UE resets accumulation for UL BWP b of carrier f of serving cell c

When $P_{O\_UE\_PUSCH,b,f,c}(j)$ value is changed by higher layers;

When $P_{O\_UP\_PUSCH,b,f,c}(j)$ value is received by higher layers and serving cell c is a secondary cell;

When $\alpha_{f,b,c}(j)$ value is changed by higher layers;

If j>1, the PUSCH transmission is scheduled by a DCI format 0_1 that includes a SRI field, and the UE is provided higher layer parameter SRI-PUSCH-PowerControl, the UE determines the value of l from the value of j based on an indication by the SRI field for a sri-PUSCH-PowerControlld value associated with the sri-P0-PUSCH-AlphaSetId value corresponding to j and with the sri-PUSCH-ClosedLoopindex value corresponding to l If j>1 and the PUSCH transmission is scheduled by a DCI format 0_0 or by a DCI format 0_1 that does not include a SRI field or the UE is not provided higher layer parameter SRI-PUSCH-PowerControl, l=0

If j=1, l is provided by the value of higher layer parameter powerControlLoopToUse $f_{b,f,c}(0,l)=0$ is the first value after reset of accumulation.

$f_{b,f,c}(i,l)=\delta_{PUSCH,b,f,c}(i-K_{PUSCH},l)$ is the PUSCH power control adjustment state for UL BWP b of carrier f of serving cell c and PUSCH transmission period i if accumulation is not enabled based on higher layer parameter tpc-Accumulation, where If the PUSCH transmission is in response to a PDCCH decoding with DCI format 0_0 or DCI format 0_1, or 2_2 having CRC parity bits scrambled by TPC-PUSCH-RNTI, the respective $P_{USCH,b,f,c}$ absolute values are given in Table 7.1.1-1.

$f_{b,f,c}(i,l)=f_{b,f,c}(i-1,l)$ for a PUSCH transmission period where the UE does not detect a DCI format 0_0 or DCI format 0_1, or 2_2 having CRC parity bits scrambled by TPC-PUSCH-RNTI UL BWP b of for carrier f of serving cell c.

If the UE receives the random access response message for UL BWP b of carrier f of serving cell c $f_{b,f,c}(0,l)=+\Delta P_{rampub,f,c}+\delta_{msg2,b,f,c}$, where l=0 and $\delta_{msg2,b,f,c}$ is the TPC command indicated in the random access response grant of the random access response message corresponding to the random access preamble transmitted on UL BWP b of carrier f in the serving cell c, and $$\Delta P_{rampup,b,f,c} = \min\left[\left\{\max\left(0, P_{CMAX,f,c} - \left(\begin{array}{c} 10\log_{10}(2^\mu \cdot M_{RB,b,f,c}^{PUSCH}(0)) + \\ P_{O\_PUSCH,b,f,c}(0) + \alpha_{b,f,c}(0) \cdot PL_c + \\ \Delta_{TF,b,f,c}(0) + \delta_{msg2,b,f,c} \end{array}\right)\right)\right\}, \Delta P_{rampuprequested,b,f,c}\right]$$

and $\Delta P_{rompuprequested,b,f,c}$ is provided by higher layers and corresponds to the total power ramp-up requested by higher layers from the first to the last random access preamble for carrier f in the serving cell c, $M_{RB,b,f,c}^{PUSCH}(0)$ is the bandwidth of the PUSCH resource assignment expressed in number of resource blocks for the first PUSCH transmission on UL BWP b of carrier f of serving cell c, and $\Delta_{TF,b,f,c}(0)$ is the power adjustment of first PUSCH transmission on UL BWP b of carrier f of serving cell c.

[Table 7.1.1-1 of 3GPP R1-1805795, Entitled "Mapping of TPC Command Field in DCI Format 0_0, DCI Format 0_1, or DCI Format 2_2, Having CRC Parity Bits Scrambled by TPC-PUSCH-RNTI, or DCI Format 2_3, to Absolute and Accumulated $\delta_{PUSCH,b,f,c}$ Values or $\delta_{SRS,b,f,c}$ Values", is Reproduced as FIG. 14]

7.2 Physical Uplink Control Channel

[ . . . ]

7.2.1 UE Behaviour

If a UE transmits a PUCCH on active UL BWP b of carrier f in the primary cell c using PUCCH power control adjustment state with index l, the UE determines the PUCCH transmission power $P_{PUCCH,b,f,c}(i,q_u,q_d,l)$ in PUCCH transmission period i as $$P_{PUCCH,b,f,c}(i, q_u, q_d, l) = \min\left\{ \begin{array}{l} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{array} \right\} [dBm]$$

where
- $P_{CMAX,f,c}(i)$ is the configured UE transmit power defined in [8-1, TS 38.101-1] and [8-2, TS38.101-2] for carrier f of serving cell c in PUCCH transmission period i.
- < . . . >
- $PL_{b,f,c}(q_d)$ is a downlink path-loss estimate in dB calculated by the UE using reference signal (RS) index $q_d$ for a DL BWP that is paired with UL BWP b of carrier f of serving cell C.
- $PL_{b,f,c}(q_d)$ is a downlink path-loss estimate in dB calculated by the UE using reference signal (RS) index $q_d$ for a DL BWP that is paired with UL BWP b of carrier f of the primary cell c.
  - If the UE is not provided higher layer parameter pathlossReferenceRSs and before the UE is provided with dedicated higher layer parameters, the UE calculates $PL_{b,f,c}(q_d)$ using a RS resource obtained from the SS/PBCH block that the UE obtains higher layer parameter MasterInformationBlock.
  - If the UE is provided a number of RS resource indexes, the UE calculates $PL_{b,f,c}(q_d)$ using RS resource $q_d$, where $0 \leq q_d < Q_d$. $Q_d$ is a size for a set of RS resources provided by higher layer parameter maxNrof-PUCCH-PathlossReferenceRSs. The set of RS resources is provided by higher layer parameter pathlossReferenceRSs. The set of RS resources can include one or both of a set of SS/PBCH block indexes, each provided by higher layer parameter ssb-Index in PUCCH-PathlossReferenceRS when a value of a corresponding higher layer parameter pucch-PathlossReferenceRS-Id maps to a SS/PBCH block index, and a set of CSI-RS resource indexes, each provided by higher layer parameter csi-RS-Index when a value of a corresponding higher layer parameter pucch-PathlossReferenceRS-Id maps to a CSI-RS resource index. The UE identifies a RS resource in the set of RS resources to correspond either to a SS/PBCH block index or to a CSI-RS resource index as provided by higher layer parameter pucch-PathlossReferenceRS-Id in PUCCH-PathlossReferenceRS.
  - If the UE is provided higher layer parameter PUCCH-SpatialRelationInfo, the UE obtains a mapping, by indexes provided by corresponding higher layer parameters pucch-PathlossReferenceRS-Id, between a set of pucch-SpatialRelationInfold values and a set of referencesignal values provided by higher layer parameter PUCCH-PathlossReferenceRS. If the UE is provided more than one values for pucch-Spatia/Relation/nfold and the UE receives an activation command [11, TS 38.321] indicating a value of pucch-SpatialRelationInfold, the UE determines the referencesignal value in PUCCH-PathlossReferenceRS through the link to a corresponding pucch-PathlossReferenceRS-Id index. The UE applies the activation command 3 msec after a slot where the UE transmits HARQ-ACK information for the PDSCH providing the activation command.
  - If the UE is not provided higher layer parameter PUCCH-SpatialRelationInfo, the UE obtains the referencesignal value in PUCCH-PathlossReferenceRS from the pucch-PathlossReferenceRS-Id with index 0 in PUCCH-PathlossReferenceRSs.
- The parameter $\Delta_{F\_PUCCH}(F)$ is provided by higher layer parameter deltaF-PUCCH-f0 for PUCCH format 0, deltaF-PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4.

7.3 Sounding Reference Signals

For SRS, the linear value $\hat{P}_{SRS,b,f}(i,q_s,l)$ of the transmit power $P_{SRS,b,f,c}(i,q_s,l)$ on UL BWP b of carrier f of serving cell c is split equally across the configured antenna ports for SRS. The UL BWP b is the active UL BWP.

7.3.1 UE Behaviour

If a UE transmits SRS on UL BWP b of carrier f of serving cell c using SRS power control adjustment state with index l, the UE determines the SRS transmission power $P_{SRS,b,f,c}(i,q_s,l)$ in SRS transmission period i as $$P_{SRS,b,f,c}(i, q_s, l) = \min\left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\} [dBm]$$

where,
- $P_{CMAX,f,c}(i)$ is the configured UE transmit power defined in [8, TS 38.101-1] and [8-2, TS38.101-2] for carrier f of serving cell c in SRS transmission period i.
- < . . . >
- $PL_{b,f,c}(q_d)$ is a downlink path-loss estimate in dB calculated by the UE using reference signal (RS) index $q_d$ for a DL BWP that is paired with UL BWP b of carrier f of serving cell c and SRS resource set $q_s$ [6, TS 38.214]. The RS index $q_d$ is provided by higher layer parameter pathlossReferenceRS associated with the SRS resource set $q_s$ and is either a higher layer parameter ssb-Index providing a SS/PBCH block index or a higher layer parameter csi-RS-Index providing a CSI-RS resource index.
- For the SRS power control adjustment state for UL BWP b of carrier f of serving cell c and SRS transmission period i
  - $h_{b,f,c}(i,l) = f_{b,f,c}(i,l)$, where $f_{b,f,c}(i,l)$ is the current PUSCH power control adjustment state as described in Subclause 7.1.1, if higher layer parameter srs-Power- ControlAdjustmentStates indicates a same power control adjustment state for SRS transmissions and PUSCH transmissions; or $h_{b,f,c}(i)=h_{b,f,c}(i-1)+\delta_{SRS,b,f,c}(i-K_{SRS})$ if the UE is not configured for PUSCH transmissions on UL BWP b of carrier f of serving cell c, or if higher layer parameter srs-PowerControlAdjustmentStates indicates a separate power control adjustment state between SRS transmissions and PUSCH transmissions, and if accumulation is enabled based on the parameter tpc-Accumulation provided by higher layers, where $\delta_{SRS,b,f,c}(i-K_{SRS})$ is jointly coded with other TPC commands in a PDCCH with DCI format 2_3, as described in Subclause 11.4, that is last received by the UE prior to the SRS transmission and accumulative values of $\delta_{SRS,b,f,c}(i-K_{SRS})$ are provided in Table 7.1.1-1, where $\delta_{SRS,b,f,c}(i-K_{SRS})=0$ dB if the UE does not detect a TPC command for serving cell c.

If the UE has reached $P_{CMAX,f,c}(i)$ for UL BWP b of carrier f of serving cell c, the UE does not accumulate corresponding positive TPC commands.

If UE has reached minimum power for UL BWP b of carrier f of serving cell c, the UE does not accumulate corresponding negative TPC commands.

A UE resets accumulation for UL BWP b of carrier f of serving cell c

When $P_{O\_SRS,b,f,c}(q_s)$ value is changed by higher layers;

When $\alpha_{SRS,b,f,c}(q_s)$ value is changed by higher layers.

$h_{b,f,c}(0)=0$ is the first value after reset of accumulation.

If $P_{O\_SRS,b,f,c}(q_s)$ value is received by higher layers, $h_{b,f,c}(0)=0$

Else, $h_{b,f,c}(0)=\Delta P_{rampup,b,f,c}+\delta_{msg2,b,f,c}$, where $\delta_{msg2,b,f,c}$ is the TPC command indicated in the random access response grant corresponding to the random access preamble transmitted on UL BWP b of carrier f of the serving cell c, and $$\Delta P_{rampup,b,f,c} = \min\left[\max\left(0, P_{CMAX,f,c}-\left(\begin{array}{c}P_{O\_SRS,b,f,c}(q_s)+\\10\log_{10}(2^\mu \cdot M_{SRS,b,f,c}(i))+\\ \alpha_{SRS,b,f,c}(q_s)\cdot PL_{b,f,c}(q_d)\end{array}\right)\right), \Delta P_{rampuprequested,b,f,c}\right];$$

and $\Delta P_{rampuprequested,b,f,c}$ is provided by higher layers and corresponds to the total power ramp-up requested by higher layers from the first to the last preamble for UL BWP b of carrier f of serving cell c.

$h_{b,f,c}(i)=\delta_{SRS,b,f,c}(i-K_{SRS})$ if the UE is not configured for PUSCH transmissions on UL BWP b of carrier f of serving cell c, or if higher layer parameter srs-PowerControlAdjustmentStates indicates a separate power control adjustment state between SRS transmissions and PUSCH transmissions, and if accumulation is not enabled based on the higher layer parameter tpc-Accumulation, and the UE detects a DCI format 2_3 for a SRS transmission period i, where absolute values of $\delta_{SRS,b,f,c}(i-K_{SRS})$ are provided in Table 7.1.1-1

$h_{b,f,c}(i)=h_{b,f,c}(i-1)$ for a SRS transmission period i where the UE does not detect a DCI format 2_3 for UL BWP b of carrier f of serving cell c.

if higher layer parameter srs-PowerControlAdjustmentStates indicates a same power control adjustment state for SRS transmissions and PUSCH transmissions, the update of the power control adjustment state for SRS transmission period i occurs at the beginning of each SRS resource in the SRS resource set $q_s$; otherwise, the update of the power control adjustment state SRS transmission period i occurs at the beginning of the first transmitted SRS resource in the SRS resource set $q_s$

[ . . . ]

7.7 Power Headroom Report

The types of UE power headroom reports are the following. A type 1 UE power headroom PH that is valid for PUSCH transmission period i on UL BWP b of carrier f of serving cell c. A type 3 UE power headroom PH that is valid for SRS transmission period i on UL BWP b of carrier f of serving cell c.

If the UE is configured with a SCG,

For computing power headroom for cells belonging to MCG, the term 'serving cell' in this subclause refers to serving cell belonging to the MCG.

For computing power headroom for cells belonging to SCG, the term 'serving cell' in this subclause refers to serving cell belonging to the SCG. The term 'primary cell' in this subclause refers to the PSCell of the SCG.

If the UE is configured with a PUCCH-SCell,

For computing power headroom for cells belonging to primary PUCCH group, the term 'serving cell' in this subclause refers to serving cell belonging to the primary PUCCH group.

For computing power headroom for cells belonging to secondary PUCCH group, the term 'serving cell' in this subclause refers to serving cell belonging to the secondary PUCCH group. The term 'primary cell' in this subclause refers to the PUCCH-SCell of the secondary PUCCH group.

7.7.1 Type 1 PH Report

If a UE transmits PUSCH in PUSCH transmission period i on active UL BWP b of carrier f of serving cell c, the UE computes a power headroom for a Type 1 report as $PH_{type1,b,f,c}(i,j,q_d,l)=P_{CMAX,f,c}(i)-\{P_{O\_PUSCH,b,f,c}(j)+10\log_{10}(2^\mu \cdot M_{RB,b,f,c}^{PUSCH}(i))+\alpha_{b,f,c}(j)\cdot PL_{b,f,c}(q_d)+\Delta_{TF,b,f,c}(i)+f_{b,f,c}(i,l)\}$ [dB]

where $P_{CMAX,f,c}(i)$, $P_{O\_PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$ and $f_{b,f,c}(i,l)$ are defined in Subclause 7.1.1.

If the UE does not transmit PUSCH in PUSCH transmission period i on UL BWP b of carrier f of serving cell c, the UE computes a power headroom for a Type 1 report as $PH_{type1,b,f,c}(i,j,q_d,l)=\tilde{P}_{CMAX,f,c}(i)-\{P_{O\_PUSCH,b,f,c}(j)+\alpha_{b,f,c}(j)\cdot PL_{b,f,c}(q)+f_{b,f,c}(i,l)\}$ [dB]

where $\tilde{P}_{CMAX,f,c}(i)$ is computed assuming MPR=0 dB, A-MPR=0 dB, P-MPR=0 dB. $\Delta T_C$=0 dB. MPR, A-MPR, P-MPR and $\Delta T_C$ are defined in [8-1, TS 38.101-1] and [8-2, TS38.101-2]. The remaining parameters are defined in Subclause 7.1.1 where $P_{O\_PUSCH,b,f,c}(j)$ and $\alpha_{b,f,c}(j)$ are provided from p0-PUSCH-AlphaSetId=0 for the UL BWP b of carrier f of serving cell c, $PL_{b,f,c}(q_d)$ is obtained using PathlossReferenceRS-Id=0, and l=0.

7.7.2 Type 2 PH Report
This subclause is reserved.

7.7.3 Type 3 PH Report
If a UE transmits SRS in a SRS transmission period i on active UL BWP b of carrier f of serving cell c and the UE is not configured for PUSCH transmissions on carrier f of serving cell c, the UE computes a power headroom for a Type 3 report as $$PH_{type3,b,f,c}(i,q_s,l) = P_{CMAX,f,c}(i) - \{P_{O\_SRS,b,f,c}(q_s) + 10 \log_{10}(2^\mu \cdot M_{SRS,b,f,c}(i)) + \alpha_{SRS,b,f,c}(q) \cdot PL_{b,f,c}(q) + h_{b,f,c}(i,l)\} [dB]$$

where $P_{CMAX,f,c}(i)$, $P_{O\_SRS,b,f,c}(q_s)$, $M_{SRS,b,f,c}(i)$, $\alpha_{SRS,b,f,c}(q)$, $PL_{b,f,c}(q_d)$ and $h_{b,f,c}(i,l)$ are defined in Subclause 7.3.1.

If the UE does not transmit SRS in SRS transmission period i on UL BWP b of carrier f of serving cell c, and the UE is not configured for PUSCH transmissions on UL BWP b of carrier f of serving cell c, the UE computes power headroom for a Type 3 report as $$PH_{type3,b,f,c}(i,q_s,l) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{f,c}(i,l)\} [dB]$$

where $q_s$ is a SRS resource set corresponding to SRS-ResourceSetId=0 and $P_{O\_SRS,b,f,c}(q_s)$, $\alpha_{SRS,f,c}(q_s)$, $PL_{b,f,c}(q_d)$ and $h_{b,f,c}(i,l)$ are defined in Subclause 7.3.1 with corresponding values obtained from SRS-ResourceSetId=0 and l=0. $\tilde{P}_{CMAX,f,c}(i)$ is computed assuming MPR=0 dB, A-MPR=0 dB, P-MPR=0 dB and $\Delta T_C$=0 dB. MPR, A-MPR, P-MPR and $\Delta T_C$ are defined in [8-1, TS 38.101-1] and [8-2, TS38.101-2].

More detail about PHR triggering and reporting are included in 3GPP TS 38.321 V15.1.0 as follows:

5.4.6 Power Headroom Reporting

The Power Headroom reporting procedure is used to provide the serving gNB with information about the difference between the nominal UE maximum transmit power and the estimated power for UL-SCH transmission per activated Serving Cell and also with information about the difference between the nominal UE maximum power and the estimated power for UL-SCH and PUCCH transmission on SpCell and PUCCH SCell.

RRC controls Power Headroom reporting by configuring the following parameters:
- phr-PeriodicTimer;
- phr-ProhibitTimer;
- phr-Tx-PowerFactorChange;
- phr-Type2PCell;
- phr-Type2OtherCell;
- phr-ModeOtherCG;
- multiplePHR.

A Power Headroom Report (PHR) shall be triggered if any of the following events occur:
- phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;
- phr-PeriodicTimer expires;
- upon configuration or reconfiguration of the power headroom reporting functionality by upper layers, which is not used to disable the function;
- activation of an SCell of any MAC entity with configured uplink;
- addition of the PSCell;
- phr-ProhibitTimer expires or has expired, when the MAC entity has UL resources for new transmission, and the following is true for any of the activated Serving Cells of any MAC entity with configured uplink:
  - there are UL resources allocated for transmission or there is a PUCCH transmission on this cell, and the required power backoff due to power management (as allowed by P-MPR$_c$ as specified in TS 38.101 [10]) for this cell has changed more than phr-Tx-PowerFactorChange dB since the last transmission of a PHR when the MAC entity had UL resources allocated for transmission or PUCCH transmission on this cell.

NOTE: The MAC entity should avoid triggering a PHR when the required power backoff due to power management decreases only temporarily (e.g. for up to a few tens of milliseconds) and it should avoid reflecting such temporary decrease in the values of $P_{CMAX,c}$/PH when a PHR is triggered by other triggering conditions.

If the MAC entity has UL resources allocated for new transmission the MAC entity shall:
1> if it is the first UL resource allocated for a new transmission since the last MAC reset:
  2> start periodicPHR-Timer;
1> if the Power Headroom reporting procedure determines that at least one PHR has been triggered and not cancelled, and;
1> if the allocated UL resources can accommodate the MAC CE for PHR which the MAC entity is configured to transmit, plus its subheader, as a result of logical channel prioritization:
  2> if multiplePHR is configured:
    3> for each activated Serving Cell with configured uplink associated with any MAC entity:
      4> obtain the value of the Type 1 or Type 3 power headroom for the corresponding uplink carrier;
      4> if this MAC entity has UL resources allocated for transmission on this Serving Cell; or
      4> if the other MAC entity, if configured, has UL resources allocated for transmission on this Serving Cell and phr-ModeOtherCG is set to real by upper layers:
        5> obtain the value for the corresponding $P_{CMAX,c}$ field from the physical layer.
    3> if phr-Type2PCell is configured:
      4> obtain the value of the Type 2 power headroom for the PCell;
      4> obtain the value for the corresponding $P_{CMAX,c}$ field from the physical layer.
    3> if phr-Type2OtherCell is configured:
      4> if PUCCH SCell is configured:
        5> obtain the value of the Type 2 power headroom for the PUCCH SCell.
      4> else (i.e. other CG is configured):
        5> obtain the value of the Type 2 power headroom for the SpCell of the other MAC entity.
      4> obtain the value for the corresponding $P_{CMAX,c}$ field from the physical layer.
    3> instruct the Multiplexing and Assembly procedure to generate and transmit a PHR MAC CE according to configured ServCellIndex and the PUCCH(s) for the MAC entity as defined in subclause 6.1.3.9 based on the values reported by the physical layer.
  2> else (i.e. Single Entry PHR format is used):
    3> obtain the value of the Type 1 or Type 3 power headroom from the physical layer for the corresponding uplink carrier of the PCell;

3> obtain the value for the corresponding $P_{CMAX,c}$ field from the physical layer;

3> instruct the Multiplexing and Assembly procedure to generate and transmit a PHR MAC CE as defined in subclause 6.1.3.8 based on the value reported by the physical layer.

2> start or restart periodicPHR-Timer;

2> start or restart prohibitPHR-Timer;

2> cancel all triggered PHR(s).

As discussed above, there are several trigger of power headroom report, e.g. pathloss change, timer expiring. When transmissions are performed with narrow, the beam(s) used for transmission may be changed frequently, e.g., due to blockage or scheduling flexibility. However, if the triggering is too frequent while the power situation is unchanged, unnecessary power headroom report would be generated and included without providing base station additional information than what has been provided. On the other hand, if the power status has changed while no power headroom report is triggered, base station may not make correct decision for scheduling since up-to date information is not provided. For example, pathloss derived from different beam may be different such that when the scheduled beam changes from one beam to another beam, pathloss difference may exceed the threshold and a power headroom report is triggered. However, the channel condition within each beam may be similar and the report may not be very helpful.

On the other hand, even if the pathloss is kept similar, it is possible that channel condition for a beam has been changing a lot while a report would not be triggered. The above analysis can also be applied to the case where UE use more than one beam for transmission. Another factor which may have impact on power headroom triggering is power control algorithm. It is possible that the power control is applied on a per UE basis, e.g. UE would transmits on different beams with similar power level and one control loop is maintained. Alternatively, power control can apply on a per UE beam, TRP beam, or TRP basis, e.g. power control for each UE beam is controlled independently and multiple control loops are maintained. Alternatively, it is also possible that power control for certain UE beams is controlled in a similar way, e.g. as a group, and power control for some other UE beams is controlled in another way, e.g. as another group. An example of group is that UE beams associated with a same TRP belong to the same group. Another example of group is that UE beams associated with a same base station beam or TRP beam belong to the same group. The triggering of power headroom would need to take the aspects into account as well.

When there are multiple pathloss references configured for a UE, so that there would be multiple pathloss values available (for a given time or for a given slot). How to design properly regarding choosing pathloss values for pathloss change comparison need to be taken care. With properly design, PHR trigger results from pathloss change comparison could be more efficient.

Figure 15:
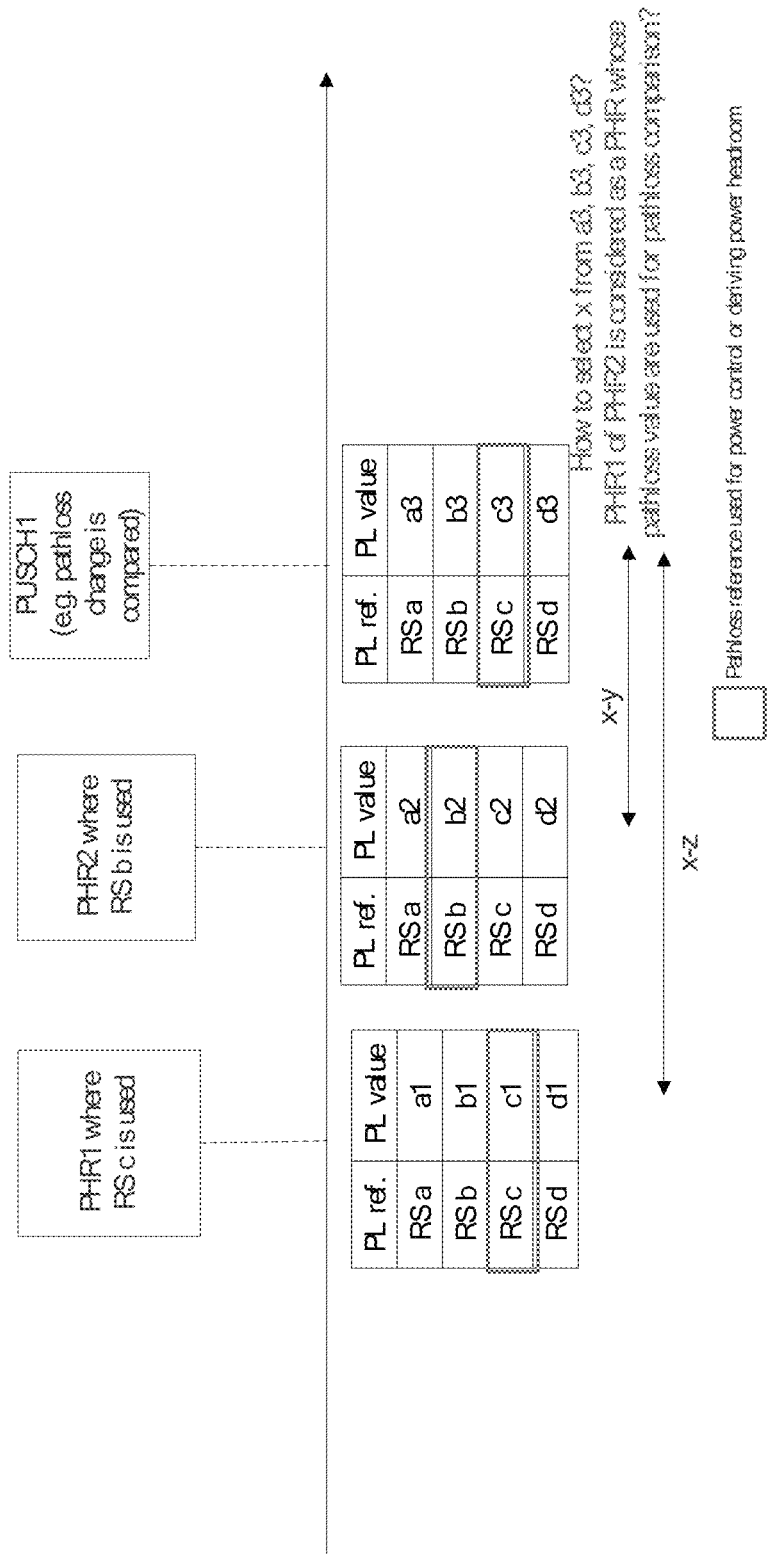
FIG. 15 is a diagram according to one exemplary embodiment.

The above issue could be described as: How to determine "a previous pathloss value, e.g. associated with a PHR" and/or how to determine a current pathloss value when UE determine PHR is triggered due to pathloss or not. Note that determine a previous pathloss value, e.g. associated with a PHR" may comprise determine pathloss value and/or determine which RS is the associated PHR. For example, the issue could be illustrated by FIG. 15. Assume 4 RSs (including RS a, RS b, RS c, and RS d) are configured as pathloss reference in FIG. 15. As shown in FIG. 15, which of a3, b3, c3, d3 is used as a pathloss value for pathloss change determination (e.g. served as x) need to be solved. For example, how to select x from a3, b3, c3, and d3? Besides, as PHR 2 is the last PHR after PHR1, is PHR1 or PHR2 considered as a PHR with pathloss value which is used for pathloss comparison?

If PHR 2 is considered as the PHR for pathloss comparison, e.g. x-y is considered as pathloss change, which of a2, b2, c2, d2 are used as pathloss change determination, e.g. served as y. If PHR 1 is considered as the PHR for pathloss comparison, e.g. x-z is considered as pathloss change, which of a1, b1, c1, d1 are used as pathloss change determination, e.g. served as z.

In one embodiment, this application is applicable for a case when UE is not configured with a secondary cell (SCell), e.g. for single cell.

In one embodiment, this application is applicable for a case when UE is configured with at least one secondary cell (SCell), e.g. for the case of multiple cells, for the case of carrier aggregation or for the case of dual connectivity In one embodiment, the pathloss reference could be configured for PUSCH and/or PUCCH and/or SRS. In one embodiment, the PHR is for PUSCH and/or PUSCH+ PUCCH and/or SRS.

Solution—

A first general concept of this invention is that a power headroom report would be triggered due to change of pathloss for a specific UE beam or a set of UE beams larger than a threshold. The UE may determine whether the pathloss of the specific UE beam or the set of UE beams has changed if the specific UE beam or the set of UE beams is scheduled for transmission. The UE does not determine whether the pathloss of the specific UE beam or the set of UE beams has changed if the specific beam or the set of beams is not scheduled for transmission. Change of the pathloss is derived from comparison between current pathloss for the specific UE beam or the set of UE beams and previous pathloss for the specific UE beam or the set of UE beams. Comparison for pathloss change may be done for a same UE beam or a same set of UE beam.

A second general concept of this invention is that a power headroom report would be triggered due to change of pathloss associated with a TRP beam, a set of TRP beams, or a TRP larger than a threshold. The UE may determine whether the pathloss has changed if a transmission associated with the TRP beam, the set of TRP beams, or the TRP is scheduled. The UE does not determine whether the pathloss has changed if a transmission associated with the TRP beam, the set of TRP beams, or the TRP is not scheduled. Change of the pathloss is derived from comparison between current pathloss associated with the TRP beam, the set of TRP beams, or the TRP and previous pathloss associated with the TRP beam, the set of TRP beams, or the TRP.

A third general concept of this invention is that a power headroom report would be triggered due to change (or addition or activation) of serving TRP(s), change (or addition or activation) of serving TRP beam(s), change (or addition or activation) of candidate TRP beam(s), or activation (or addition) of a UE beam.

In one example, if pathloss of a specific UE beam or a set of UE beams has changed more than a threshold, a power headroom report would be triggered. Power headroom report may not be triggered if pathloss change is due to change of UE beam or set of UE beams.

The power headroom report may include power headroom for the specific UE beam or the set of UE beams. Alternatively, the power headroom report would include power headroom for all UE beams. Alternatively, the power headroom report would include power headroom for any combination of UE beam(s) within all UE beams. More specifically, a subset of combination of UE beam(s) can be configured to report. The subset of combination of UE beam(s) can be linked to the specific UE beam or set of UE beams. The subset of combination of UE beam(s) could incude UE beam which is not the specific UE beam. Furthermore, the subset of combination of UE beam(s) could include UE beam which is not within the subset of UE beams.

The set of UE beams may be UE beams associated with a TRP. Alternatively, the set of UE beams may be UE beams associated with a TRP or base station beam. In one embodiment, the set of UE beams is configured by a base station.

In one example, power headroom for a specific UE beam could be derived based on UE power status of transmission on the specific UE beam. More specifically, the power headroom for the specific UE beam could be a difference between a UE calculated transmission power for the specific beam and a maximum transmission power on the specific beam.

In one example, power headroom for a set of UE beams could be derived based on UE power status of transmission on the set of UE beams. More specifically, the power headroom for the set of UE beams could be a difference between a UE calculated transmission power for the set of beams and a maximum transmission power on the set of beams.

In one embodiment, the power control could be per UE. Alternatively, the power control could be per beam, per beam group/beam set, or per beam combination.

In another embodiment, the UE could trigger power headroom report for a group of UE beams based on a same first condition. The group of UE beams could be a subset of UE beams that can be generated by the UE. In one embodiment, triggering of power headroom report for another group of UE beams would be based on a second condition. The power headroom report could include power headroom of each UE beam within the group. The power headroom report could also include power headroom of any combination of UE beam(s) within the group.

More specifically, a subset of the any combinations of UE beam(s) could be configured to be included in the power headroom report. In one embodiment, the first condition could be pathloss of a UE beam within the group has changed more than a threshold. Furthermore, the first condition could be pathloss of a combination of UE beams within the group has changed more than a threshold. The power headroom report may not triggered if pathloss change is due to change of UE beam or set of UE beams. The comparison for pathloss change could be done for a same UE beam or a same set of UE beam. The first condition could be checked if at least one UE beam within the group of UE beams is scheduled for transmission. In one embodiment, the first condition may not be checked if none of UE beam within the group of UE beams is scheduled for transmission. The first condition may be checked if a specific UE beam or a specific beam combination within the group of UE beams is scheduled for transmission. In one embodiment, the first condition may not be checked if a specific UE beam or a specific beam combination within the group of UE beams is not scheduled for transmission. In one embodiment, the group of UE beams could be UE beams associated with a TRP. The group of UE beams could be UE beams associated with a TRP or base station beam. The group of UE beams could also be configured by a base station.

In one embodiment, power headroom for the specific UE beam could be derived based on UE power status of transmission on the specific UE beam. More specifically, the power headroom for the specific UE beam could be a difference between a UE calculated transmission power for the specific beam and a maximum transmission power on the specific beam.

In one embodiment, power headroom for a set of UE beams could be derived based on UE power status of transmission on the set of UE beams. The power headroom for the set of UE beams could be a difference between a UE calculated transmission power for the set of beams and a maximum transmission power on the set of beams. In one embodiment, the power control could be per UE, per beam, per beam group or beam set, or per beam combination.

Per beam and/or per beam combination power headroom could be reported from a UE to a base station. More specifically, UE could calculate power headroom for each beam and/or each beam combination. In one embodiment, power headroom of a beam and/or beam combination used to carry the power headroom could be calculated based on real transmission power. Power headroom of a beam and/or beam combination which is not used to carry the power headroom could be calculated assuming a same transmission is performed on the beam and/or beam combination.

In one embodiment, power headroom of a beam and/or beam combination which is not used to carry the power headroom could be calculated assuming some predefined parameter, e.g. virtual PH is reported. Base station could indicate power headroom of which beam is reported. Base station could also indicate power headroom of which beam combination is reported. In one embodiment, UE could select power headroom of which beam is reported. More specifically, UE could select beam(s) with largest power headroom(s) to report power headroom. More specifically, the UE reports power headroom together with an indicator associated with a corresponding beam.

In one embodiment, UE could select power headroom of which beam combination is reported. More specifically, UE could select beam combination(s) with largest power headroom(s) to report power headroom. More specifically, the UE reports power headroom together with an indicator associated with a corresponding beam combination.

In any of the above embodiment, pathloss of a UE beam could be derived from DL signal measured on the UE beam. In one embodiment, the DL signal is transmitted on multiple TRP or base station beam(s). More specifically, the multiple TRP or base station beam(s) could be associated with the UE beam.

In any of the above embodiment, pathloss of a set of UE beams could be derived from DL signal measured on the set of UE beams. In one embodiment, the DL signal could be transmitted on multiple TRP or base station beam(s). The multiple TRP or base station beam(s) could be associated with the set of UE beams.

In one embodiment, any or any combinations of following can be the DL signal for pathloss measurement:
  Reference signal for pathloss measurement.
  Reference signal for beam management.
  Reference signal for channel state information measurement.
  Reference signal for mobility management.
  Reference signal for demodulation.
  Beam reference signal.

Demodulation reference signal for a control channel (e.g. an uplink grant for reporting power headroom).
Demodulation reference signal for a data channel.
Channel state information reference signal.
Synchronization signal.

For determining a current pathloss value, e.g. x in FIG. 15, the following alternative are listed:
1. a pathloss value derived from pathloss reference used for power control and/or deriving power headroom value, e.g. using c3 in FIG. 15 as RS c is used as reference
2. a pathloss value derived from pathloss reference which is used for power control and/or deriving power headroom value in the last PHR, e.g. b3 as RS b is used as reference in the last PHR
3. a largest pathloss value
4. a smallest pathloss value
5. a pathloss value derived from pathloss reference which is used for deriving a previous pathloss value for pathloss change determination
6. a pathloss value derived from a specific pathloss reference
7. a pathloss value derived from a pathloss reference configured or indicated for pathloss comparison
8. a pathloss value derived from a pathloss reference with a smallest or largest RS id
9. a pathloss value derived from a pathloss reference with a smallest entry (e.g. 0) or largest entry (e.g. 3) of pathloss reference configuration For determining a previous pathloss value, e.g. y or z in FIG. 15, the following alternative are listed:
a. a pathloss value derived from pathloss reference used for power control and/or deriving power headroom value for last PHR, e.g. using b2 in FIG. 15 as RS b is used as reference for last PHR
b. a pathloss value derived from pathloss reference used for power control and/or deriving power headroom value for last PHR which is derived based on a pathloss reference which is used for PUSCH when pathloss change comparison is done (for), e.g. using c1 in FIG. 15 as RS c is used as reference for PUSCH1 and PHR 1 has the same used pathloss reference as PUSCH1
c. a pathloss value derived from pathloss reference which is used for power control and/or deriving power headroom value for PUSCH when pathloss change comparison is done (for), e.g. c2 in FIG. 15 as RS c is used as reference in the PUSCH 1
d. a largest pathloss value
e. a smallest pathloss value
f. a pathloss value derived from pathloss reference which is used for deriving a current pathloss value for pathloss change determination
g. a pathloss value derived from a specific pathloss reference
h. a pathloss value derived from a pathloss reference configured or indicated for pathloss comparison
i. a pathloss value derived from a pathloss reference with a smallest or largest RS id
j. a pathloss value derived from a pathloss reference with a smallest entry (e.g. 0) or largest entry (e.g. 3) of pathloss reference configuration Any of alternatives 1-9 and alternatives a-j above can form a new embodiment. The embodiments determine a previous pathloss vale and a current pathloss value. Pathloss change can be performed by comparison between the previous pathloss vale and the current pathloss value.

In any of alternatives 1-9 or alternatives a-j, the UE may use a different pathloss reference for power control and/or deriving power headroom than a pathloss reference for pathloss change comparison. The UE may not use a pathloss value which is used for power control and/or deriving power headroom for pathloss change comparison. The UE may use another pathloss value derived from another pathloss reference for pathloss change.

In any of alternatives 1-9 or alternatives a-j, the UE may compare pathloss value between a first pathloss value and a second pathloss value, wherein the first pathloss is used for a PUSCH transmission where pathloss change comparison is done for and the second pathloss value is used for a PHR wherein the PHR and the PUSCH use a same pathloss reference. The UE may not use pathloss value from the last PHR, while use pathloss value from earlier PHR.

A first pathloss value from alternatives 1-9 and a second pathloss value from alternatives a-j are used to derive a pathloss change. A UE could determine whether a PHR is triggered based on whether the pathloss change is more than a threshold. The UE could decide whether to report PHR accordingly, e.g. subject to whether UL resource is sufficient or not. The UE could be configured with a single cell, e.g. Primary cell (PCell).

Figure 16:
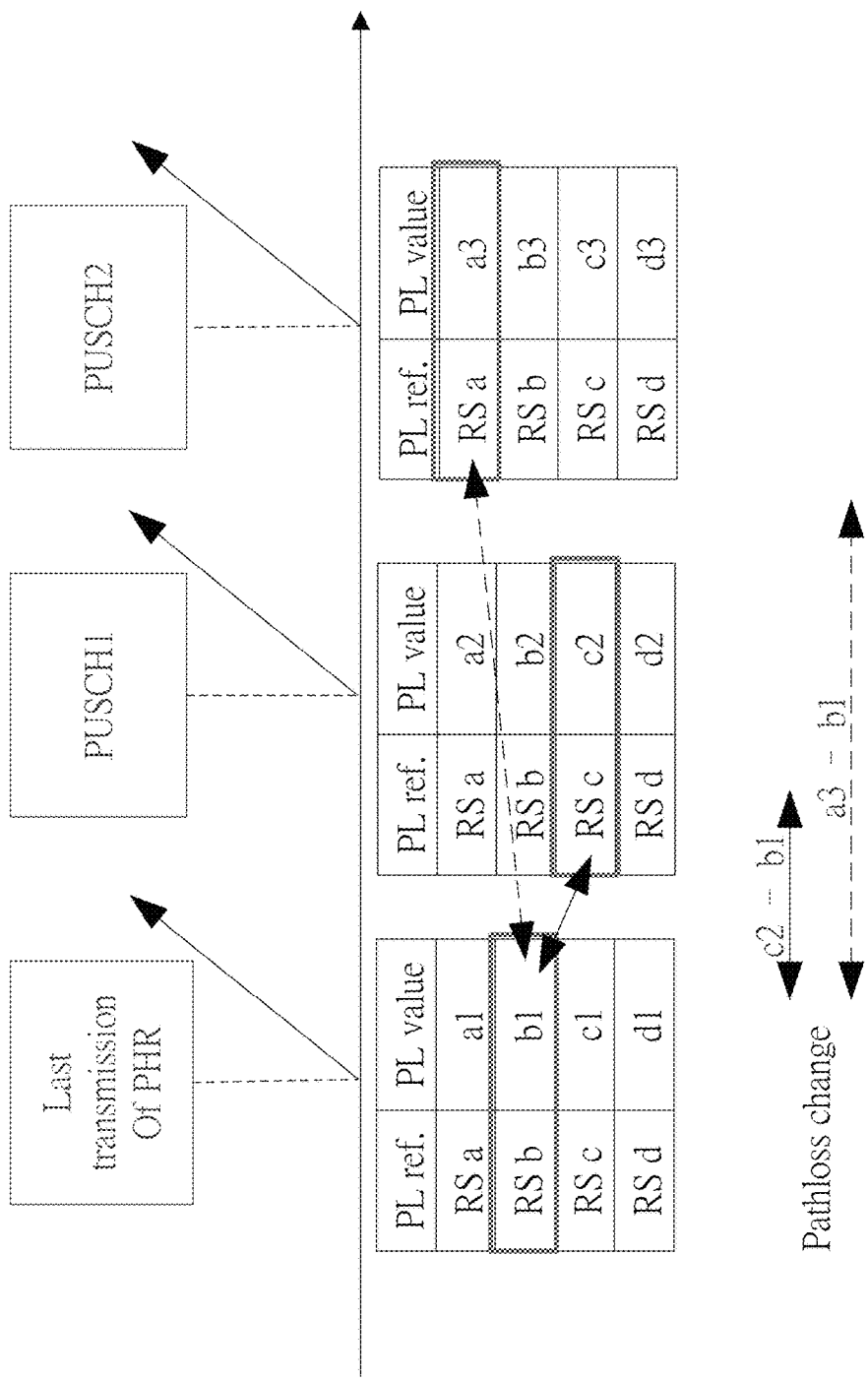
FIG. 16 is a diagram according to one exemplary embodiment.

Alt. 1 as Illustrated in FIG. 16—

Pathloss reference(s) used for pathloss change same as pathloss reference for power control or power headroom. For example, pathloss change is compared between c3 and b2. In this alternative, the pathloss reference(s) used for pathloss change determination follows the pathloss reference for power control or power headroom. This alternative is less preferable as pathloss change can be compared among different pathloss references such that the resulting pathloss change does not reflect the real channel quality change for the UE, which means the original design principle of detecting pathloss change borrowed from LTE is violated.

Figure 17:
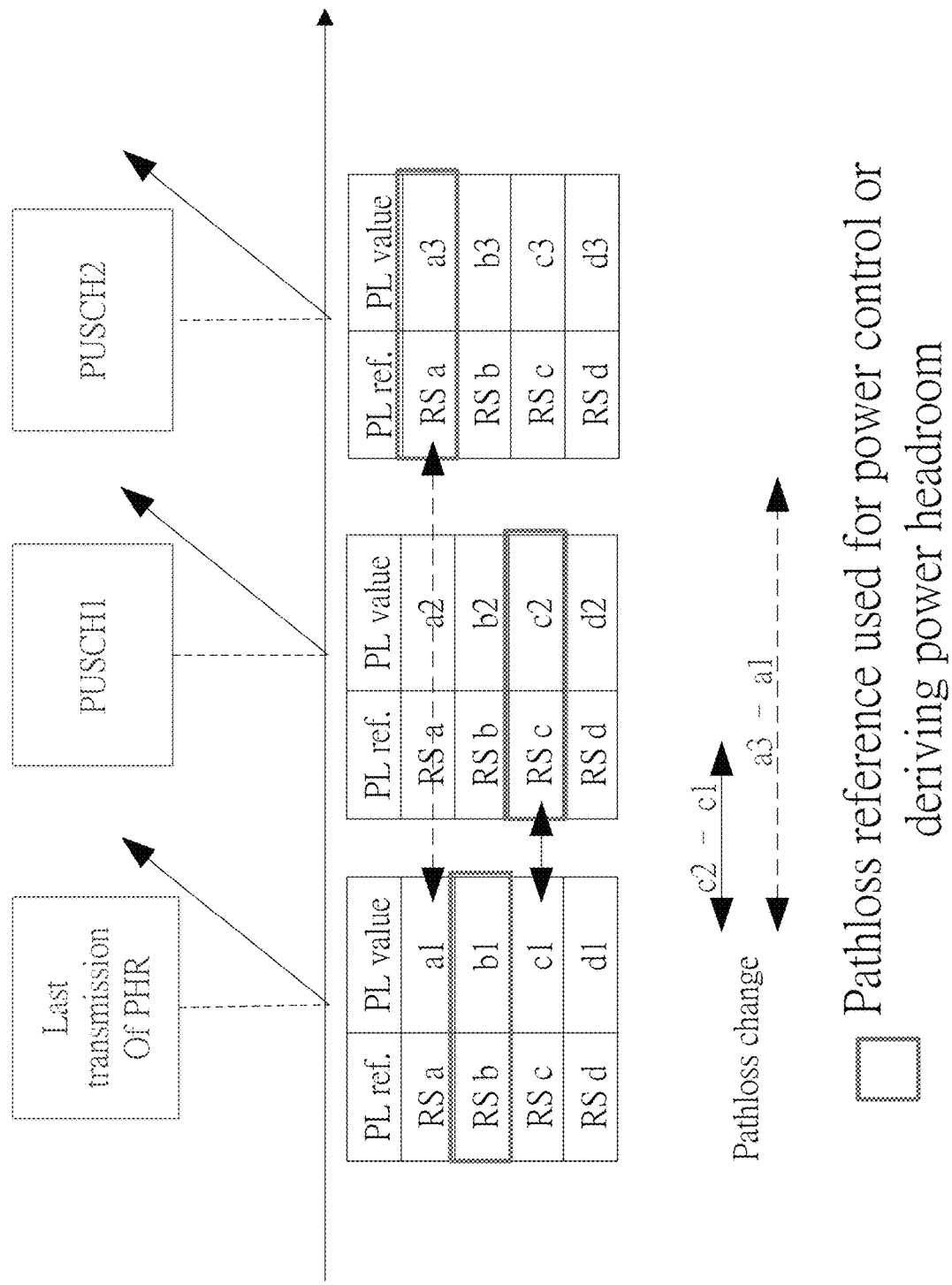
FIG. 17 is a diagram according to one exemplary embodiment.

Alt. 2 as Illustrated in FIG. 17—

Pathloss reference during last PHR transmission is determined based on "currently used reference". For example, pathloss change is compared between c3 and c2. In this alternative, x is not a constant pathloss reference while would depend on what is a currently used reference when the pathloss comparison is made. For this alternative, pathloss change is compared among pathloss values from a same pathloss reference, such the pathloss change could capture the real channel variation.

Figure 18:
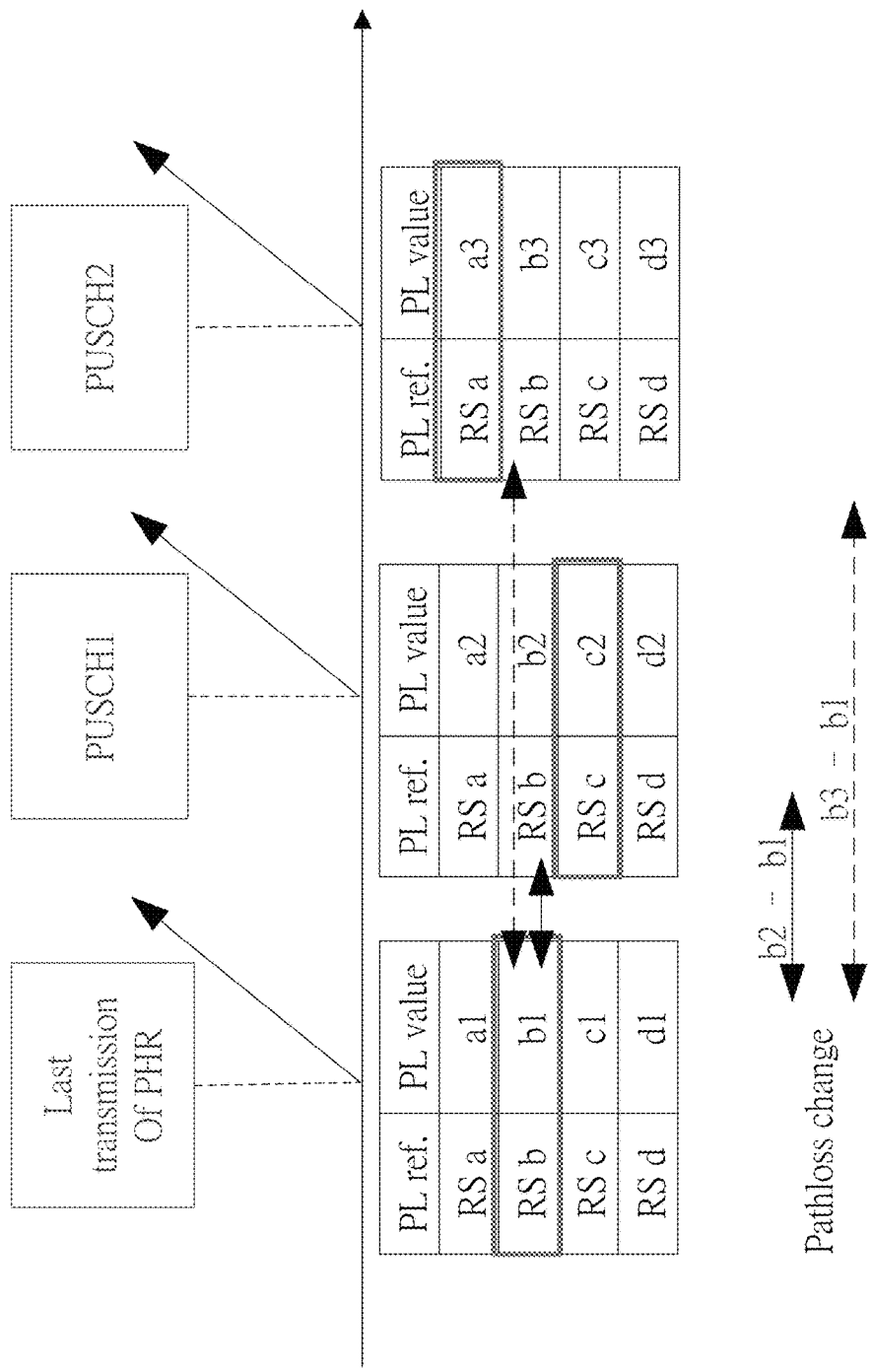
FIG. 18 is a diagram according to one exemplary embodiment.

Alt. 3 as Illustrated in FIG. 18—

"last PHR transmission" is PHR using the same reference as "currently used reference". For example, pathloss change is compared between c3 and c1. In this alternative, to use pathloss value in the last PHR with the same pathloss reference as what is a currently used reference when the pathloss comparison is made for pathloss change determination. Although the basis for comparison is not pathloss reference from a fixed time occasion, this alternative allows pathloss comparison to be done for a same pathloss reference similar as Alt. 2.

Figure 19:
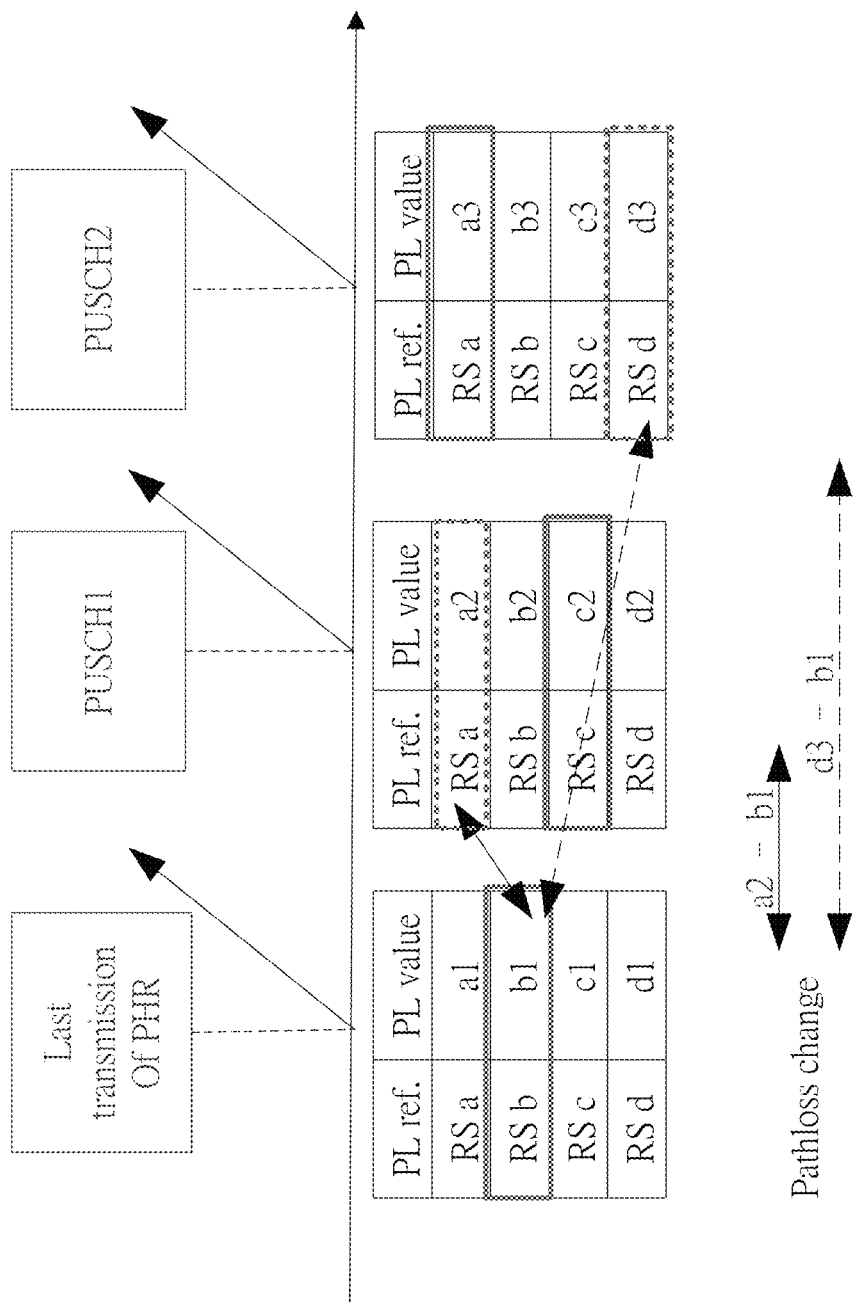
FIG. 19 is a diagram according to one exemplary embodiment.

Alt. 4 as Illustrated in FIG. 19—

Pathloss references used for pathloss change determination same as that in last PHR transmission. For example, pathloss change is compared between b3 and b2. For this alternative, the pathloss reference used for pathloss change determination is the same one used in the last PHR transmission. Similar to Alt 2, pathloss change is compared among pathloss values from a same pathloss reference, such the pathloss change could capture the real channel variation.

Figure 20:
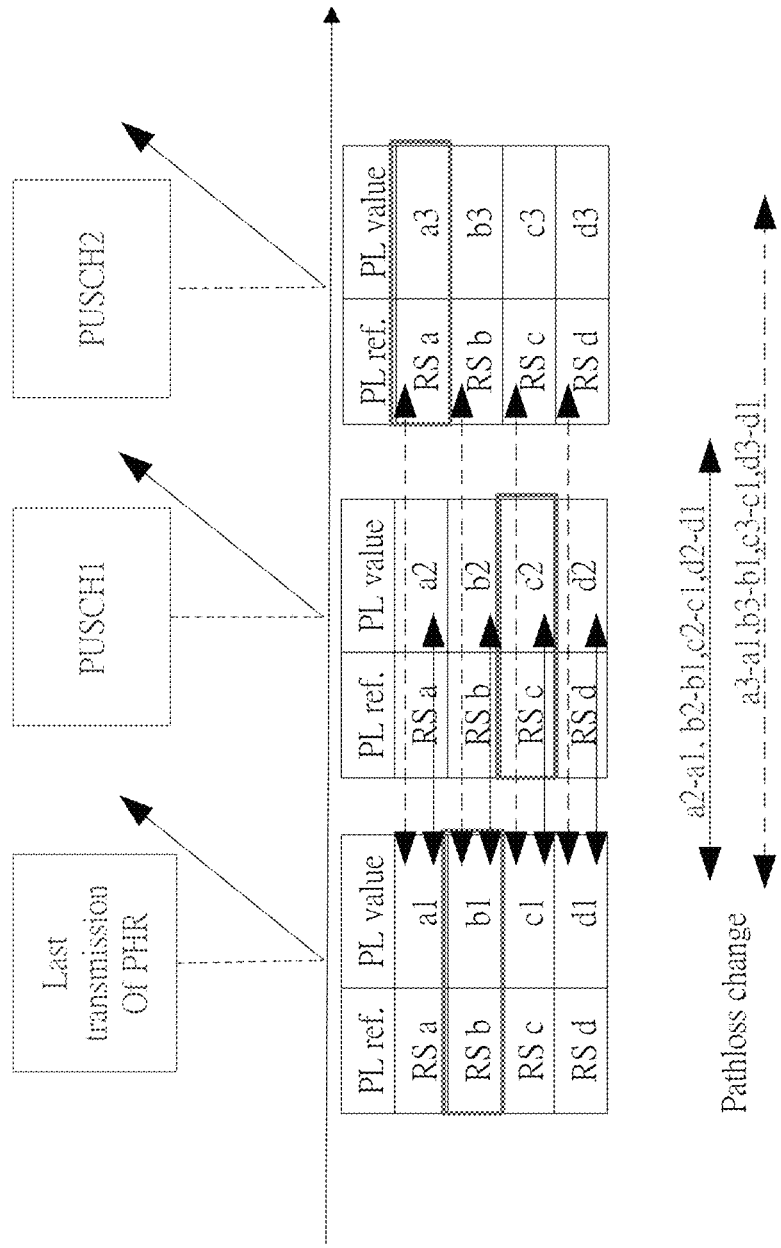
FIG. 20 is a diagram according to one exemplary embodiment.

Alt. 5 as Illustrated in FIG. 20—

Specify a predefined rule to select pathloss references used for pathloss change determination. One example of predefined rule could be the strongest pathloss reference for a given instance, i.e. the pathloss reference with least pathloss value. Similar to Alt. 1, this alternative suffers from comparing pathloss among different pathloss references. One potential drawback of this alternative is that pathloss reference for power control/PHR and pathloss reference for pathloss change are totally decoupled.

Any parts of Alt. 1 through Alt. 5 could be combined to form a new embodiment or method.

Figure 21:
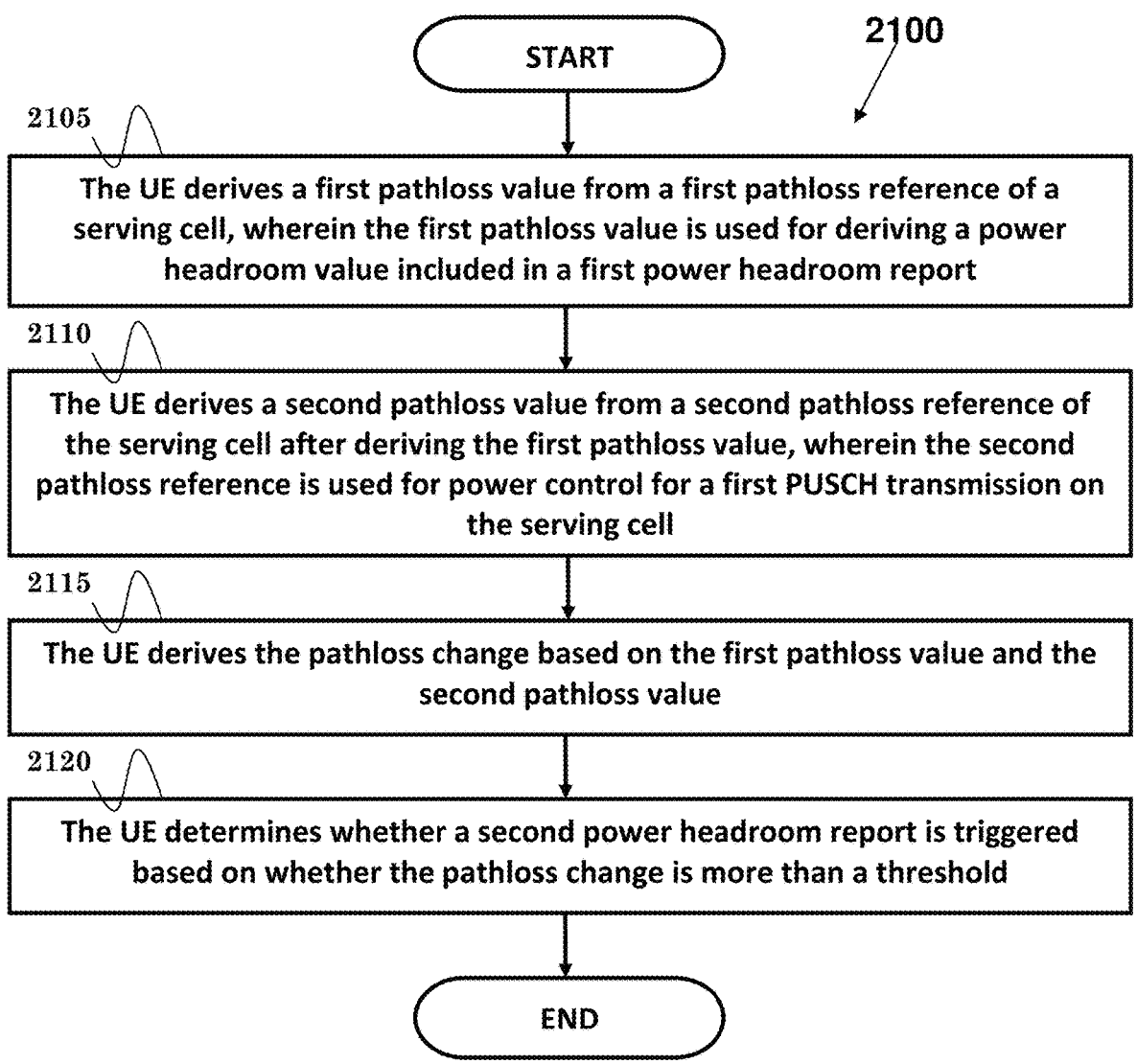
FIG. 21 is a flow chart according to one exemplary embodiment.

FIG. 21 is a flow chart 2100 according to one exemplary embodiment from the perspective of a UE. In step 2105, a UE derives a first pathloss value from a first pathloss reference of a serving cell, wherein the first pathloss value is used for deriving a power headroom value included in a first power headroom report. In step 2110, the UE derives a second pathloss value from a second pathloss reference of the serving cell after deriving the first pathloss value, wherein the second pathloss reference is used for power control for a first Physical Uplink Shared Channel (PUSCH) transmission on the serving cell. In step 2115, the UE derives the pathloss change based on the first pathloss value and the second pathloss value. In step 2120, the UE determines whether a second power headroom report is triggered based on whether the pathloss change is more than a threshold.

In one embodiment, the second power headroom report could be transmitted via the first PUSCH transmission if the second power headroom report is triggered. The first pathloss value could be used for power control for a second PUSCH transmission on the serving cell, wherein the first power headroom report is transmitted via the second PUSCH transmission.

In one embodiment, a second downlink control information (DCI) scheduling the second PUSCH transmission could indicate the first pathloss reference. The second PUSCH transmission could be configured by a parameter ConfiguredGrantConfig, and the ConfiguredGrantConfig could indicate the first pathloss reference.

In one embodiment, a first DCI scheduling the first PUSCH transmission could indicate the second pathloss reference. The first PUSCH transmission could be configured by a parameter ConfiguredGrantConfig and the ConfiguredGrantConfig indicates the second pathloss reference. The first pathloss reference could be a pathloss reference with the smallest entry of a pathloss reference configuration of the serving cell if the UE does not transmit any PUSCH transmission on the serving cell when transmitting the first power headroom report. The pathloss reference configuration could be PUSCH-PathlossReferenceRS.

Referring back to FIGS. 3 and 4, in one exemplary embodiment of a UE, the device 300 includes a program code 312 stored in the memory 310. The CPU 308 could execute program code 312 to enable the UE (i) to derive a first pathloss value from a first pathloss reference of a serving cell, wherein the first pathloss value is used for deriving a power headroom value included in a first power headroom report, (ii) to derive a second pathloss value from a second pathloss reference of the serving cell after deriving the first pathloss value, wherein the second pathloss reference is used for power control for a first PUSCH transmission on the serving cell, (iii) to derive the pathloss change based on the first pathloss value and the second pathloss value, and (iv) to determine whether a second power headroom report is triggered based on whether the pathloss change is more than a threshold. Furthermore, the CPU 308 can execute the program code 312 to perform all of the above-described actions and steps or others described herein.

Figure 22:
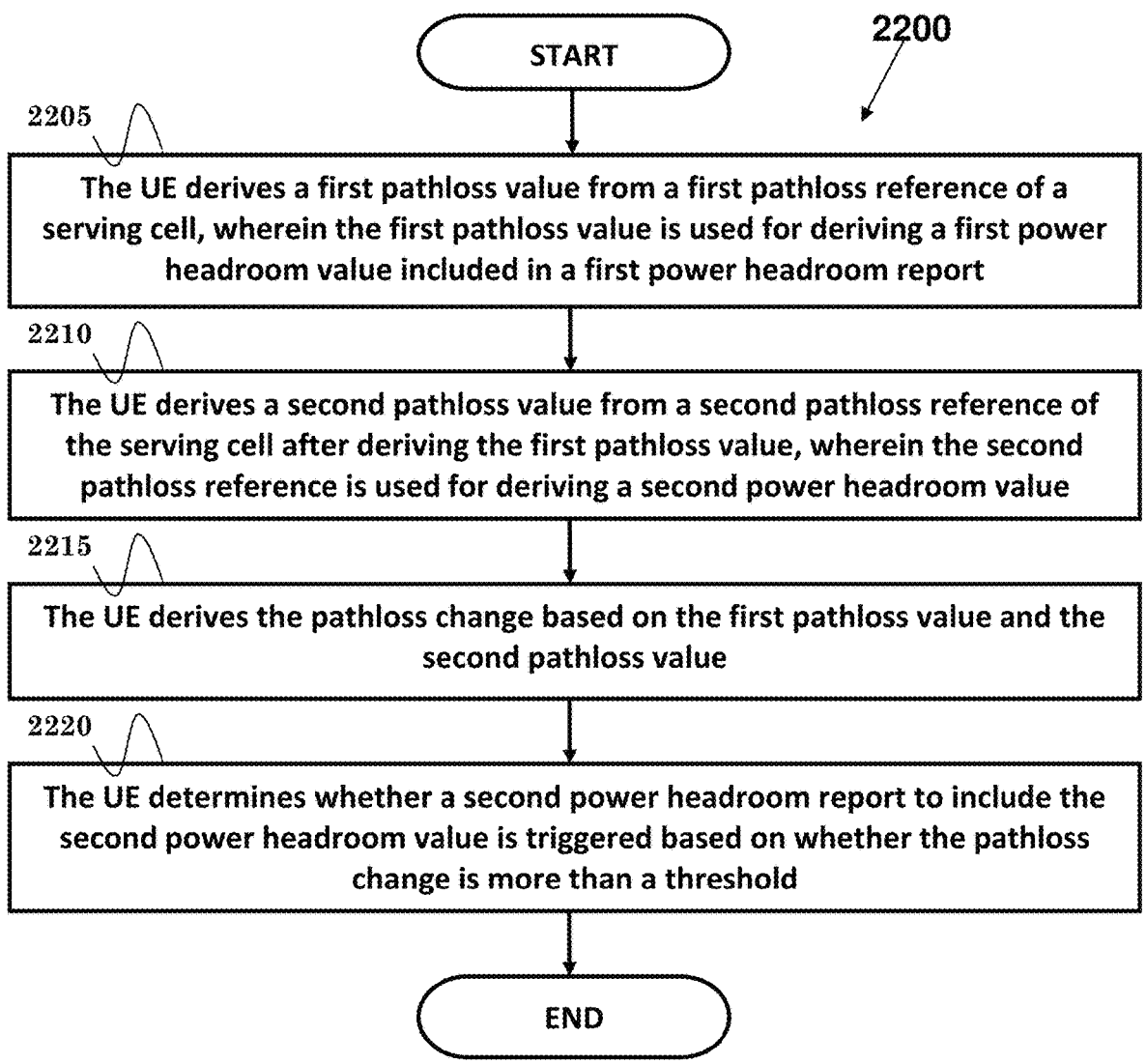
FIG. 22 is a flow chart according to one exemplary embodiment.

FIG. 22 is a flow chart 2200 according to one exemplary embodiment from the perspective of a UE. In step 2205, a UE derives a first pathloss value from a first pathloss reference of a serving cell, wherein the first pathloss value is used for deriving a first power headroom value included in a first power headroom report. In step 2210, the UE derives a second pathloss value from a second pathloss reference of the serving cell after deriving the first pathloss value, wherein the second pathloss reference is used for deriving a second power headroom value. In step 2215, the UE derives the pathloss change based on the first pathloss value and the second pathloss value. In step 2220, the UE determines whether a second power headroom report to include the second power headroom value is triggered based on whether the pathloss change is more than a threshold.

In one embodiment, the second pathloss value may not be used for power control for a PUSCH transmission on the serving cell. The smallest entry of a pathloss reference configuration of the serving cell could be the second pathloss reference.

In one embodiment, the first pathloss value could be used for power control for a PUSCH transmission on the serving cell, wherein the first power headroom report is transmitted via the PUSCH transmission. A downlink control information (DCI) scheduling the PUSCH transmission could indicate the first pathloss reference. The PUSCH transmission could be configured by a parameter ConfiguredGrantConfig, and the ConfiguredGrantConfig could indicate the first pathloss reference.

In one embodiment, the first pathloss reference could be a pathloss reference with the smallest entry of a pathloss reference configuration of the serving cell if the UE does not transmit any PUSCH transmission on the serving cell when transmitting the first power headroom report.

Referring back to FIGS. 3 and 4, in one exemplary embodiment of a UE, the device 300 includes a program code 312 stored in the memory 310. The CPU 308 could execute program code 312 to enable the UE (i) to derive a first pathloss value from a first pathloss reference of a serving cell, wherein the first pathloss value is used for deriving a first power headroom value included in a first power headroom report, (ii) to derive a second pathloss value from a second pathloss reference of the serving cell after deriving the first pathloss value, wherein the second pathloss reference is used for deriving a second power headroom value, (iii) to derive the pathloss change based on the first pathloss value and the second pathloss value, and (iv) to determine whether a second power headroom report to include the second power headroom value is triggered based on whether the pathloss change is more than a threshold. Furthermore, the CPU 308 can execute the program code 312 to perform all of the above-described actions and steps or others described herein.

Figure 23:
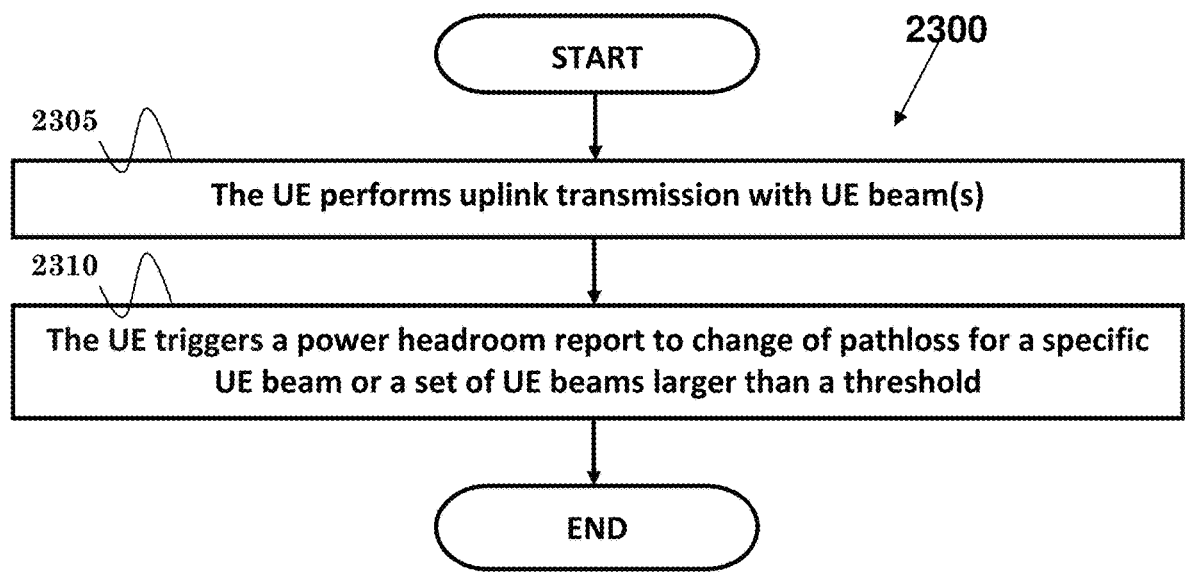
FIG. 23 is a flow chart according to one exemplary embodiment.

FIG. 23 is a flow chart 2300 according to one exemplary embodiment from the perspective of a UE. In step 2305, a UE performs uplink transmission with UE beam(s). In step 2310, a power headroom report is triggered due to change of pathloss for a specific UE beam or a set of UE beams larger than a threshold.

In one embodiment, the UE could determine whether the pathloss for the specific UE beam or the set of UE beams has changed if the specific UE beam or the set of UE beams is scheduled for transmission. Alternatively, the UE may not determine whether the pathloss for the specific UE beam or the set of UE beams has changed if the specific beam or the set of beams is not scheduled for transmission.

In one embodiment, the change of the pathloss could be derived from comparison between current pathloss for the specific UE beam or the set of UE beams and previous pathloss for the specific UE beam or the set of UE beams. Comparison for the change of the pathloss could be done for a same UE beam or a same set of UE beam.

In one embodiment, the power headroom report could be triggered if the change of the pathloss is due to change of UE beam or set of UE beams. The power headroom report could comprise power headroom for the specific UE beam or the set of UE beams.

Referring back to FIGS. 3 and 4, in one exemplary embodiment of a UE, the device 300 includes a program code 312 stored in the memory 310. The CPU 308 could execute program code 312 to enable the UE (i) to perform uplink transmission with UE beam(s), and (ii) to trigger a power headroom report to change of pathloss for a specific UE beam or a set of UE beams larger than a threshold. Furthermore, the CPU 308 can execute the program code 312 to perform all of the above-described actions and steps or others described herein.

Figure 24:
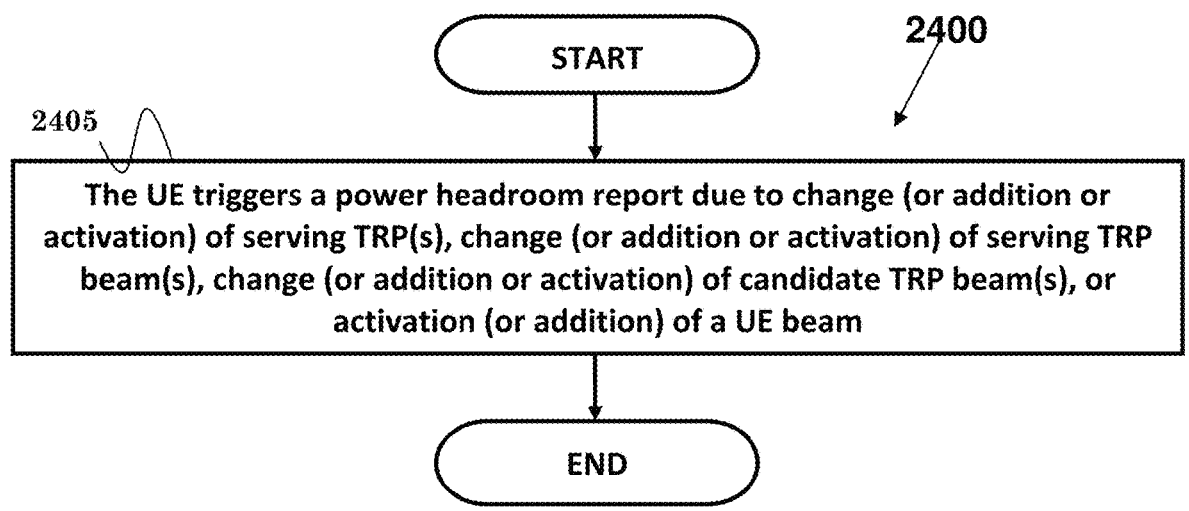
FIG. 24 is a flow chart according to one exemplary embodiment.

FIG. 24 is a flow chart 2400 according to one exemplary embodiment from the perspective of a UE. In step 2405, a power headroom report is triggered due to change (or addition or activation) of serving TRP(s), change (or addition or activation) of serving TRP beam(s), change (or addition or activation) of candidate TRP beam(s), and/or activation (or addition) of a UE beam.

In one embodiment, the UE could perform uplink transmission with UE beam(s). The UE could determine whether the pathloss has changed if a transmission associated with the TRP beam, the set of TRP beams, or the TRP is scheduled. The UE may not determine whether the pathloss has changed if a transmission associated with the TRP beam, the set of TRP beams, or the TRP is not scheduled.

In one embodiment, change of the pathloss could be derived from comparison between current pathloss associated with the TRP beam, the set of TRP beams, or the TRP and previous pathloss associated with the TRP beam, the set of TRP beams, or the TRP. The power headroom report could comprise power headroom for a specific UE beam or a set of UE beams. More specifically, the power headroom report could comprise power headroom for all UE beams. The power headroom report could also comprise power headroom for any combination of UE beam(s) within all UE beams.

In one embodiment, a subset of combination of UE beam(s) could be configured to report. The set of UE beams could be UE beams associated with a TRP or base station beam.

In one embodiment, the set of UE beams could be configured by a base station. The power headroom for the specific UE beam could be derived based on UE power status of transmission on the specific UE beam. The power headroom for the specific UE beam could be a difference between a UE calculated transmission power for the specific beam and a maximum transmission power on the specific beam. The power headroom for the set of UE beams could be derived based on UE power status of transmission on the set of UE beams. The power headroom for the set of UE beams could be a difference between a UE calculated transmission power for the set of beams and a maximum transmission power on the set of beams.

In one embodiment, power control could be per UE, per beam, per beam group or beam set, or per beam combination.

Referring back to FIGS. 3 and 4, in one exemplary embodiment of a UE, the device 300 includes a program code 312 stored in the memory 310. The CPU 308 could execute program code 312 to enable the UE to trigger a power headroom report due to change (or addition or activation) of serving TRP(s), change (or addition or activation) of serving TRP beam(s), change (or addition or activation) of candidate TRP beam(s), and/or activation (or addition) of a UE beam. Furthermore, the CPU 308 can execute the program code 312 to perform all of the above-described actions and steps or others described herein.

Figure 25:
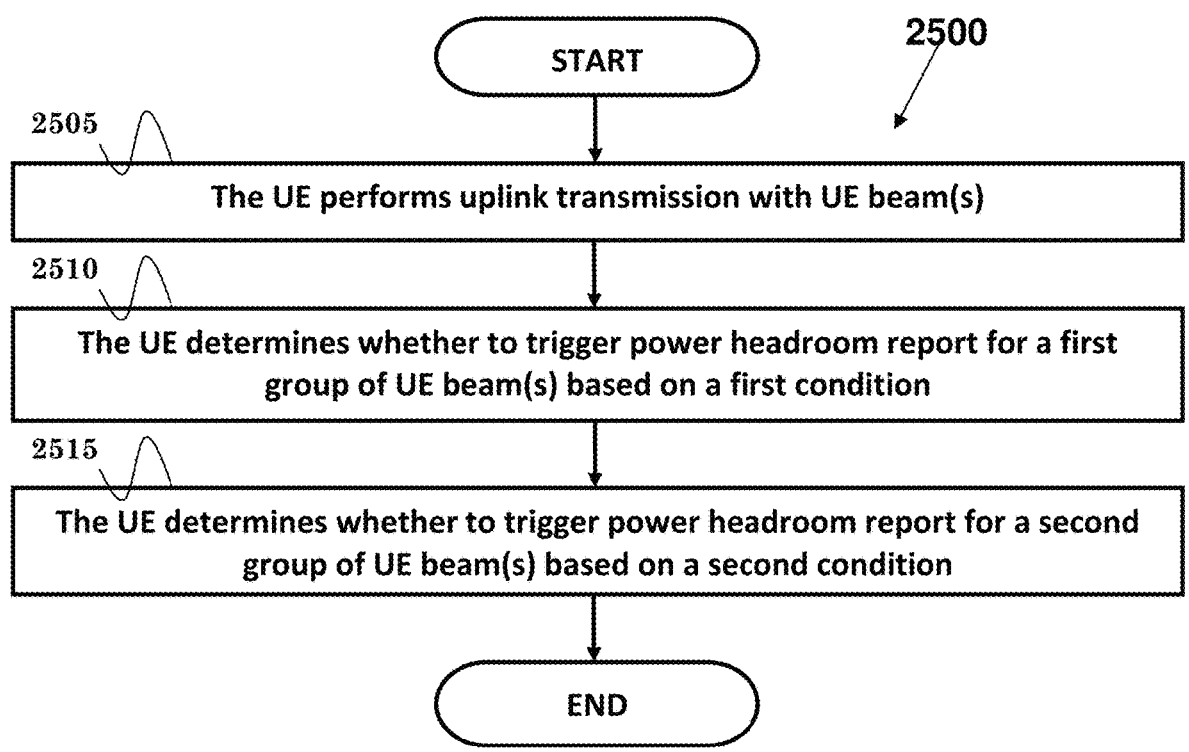
FIG. 25 is a flow chart according to one exemplary embodiment.

FIG. 25 is a flow chart 2500 according to one exemplary embodiment from the perspective of a UE. In step 2505, the UE performs uplink transmission with UE beam(s). In step 2510, the UE determines whether to trigger power headroom report for a first group of UE beam(s) based on a first condition. In step 2515, the UE determines whether to trigger power headroom report for a second group of UE beam(s) based on a second condition.

In one embodiment, the first group of UE beams is a subset of UE beams that can be generated by the UE. The power headroom report could comprise power headroom of each UE beam or any combination of UE beam(s) within the group. A subset of the any combinations of UE beam(s) could be configured to be included in the power headroom report.

In one embodiment, the first condition could be pathloss of a UE beam within the first group has changed more than a threshold. The second condition could be pathloss of a UE beam within the second group has changed more than a threshold.

In one embodiment, the first condition could be checked if at least one UE beam within the first group of UE beams is scheduled for transmission. The first condition may not be checked if none of UE beam within the first group of UE beams is scheduled for transmission.

In one embodiment, the first condition could be checked if a specific UE beam or a specific beam combination within the first group of UE beams is scheduled for transmission. The first condition may not be checked if a specific UE beam or a specific beam combination within the first group of UE beams is not scheduled for transmission.

In one embodiment, the first group of UE beams could be UE beams associated with a TRP or base station beam. The first group of UE beams could be configured by a base station.

Referring back to FIGS. 3 and 4, in one exemplary embodiment of a UE, the device 300 includes a program code 312 stored in the memory 310. The CPU 308 could execute program code 312 to enable the UE (i) to perform uplink transmission with UE beam(s), (ii) to determine whether to trigger power headroom report for a first group of UE beam(s) based on a first condition, and (iii) to determine whether to trigger power headroom report for a second group of UE beam(s) based on a second condition. Furthermore, the CPU 308 can execute the program code 312 to perform all of the above-described actions and steps or others described herein.

Figure 26:
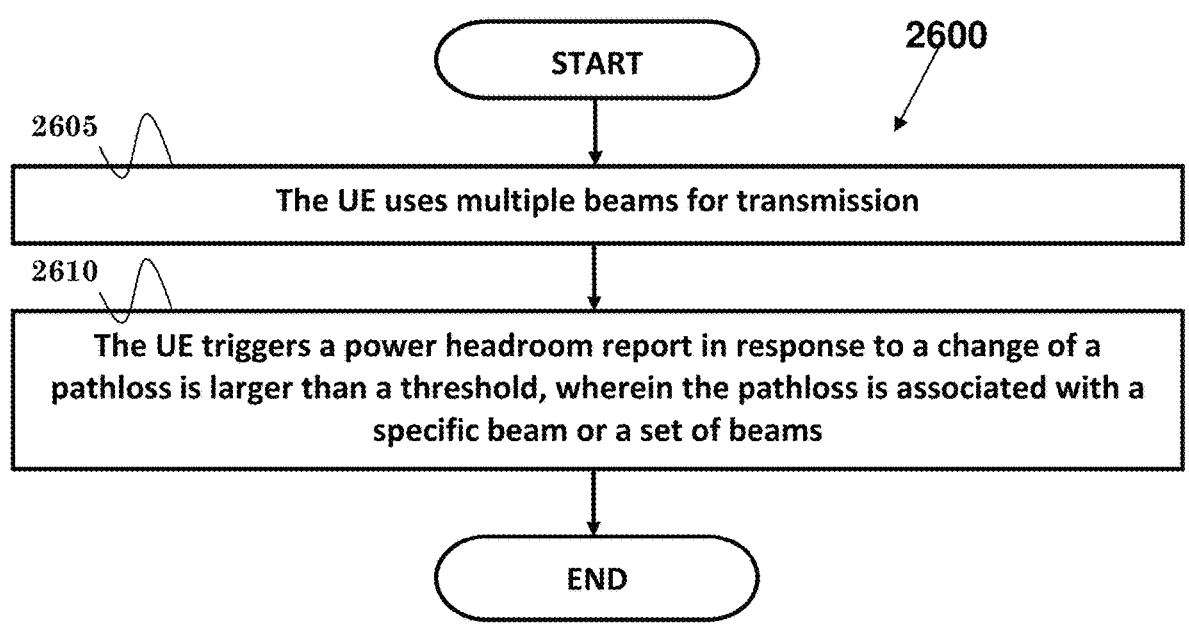
FIG. 26 is a flow chart according to one exemplary embodiment.

FIG. 26 is a flow chart 2600 according to one exemplary embodiment from the perspective of a UE. In step 2605, the UE uses multiple beams for transmission. In step 2610, the UE triggers a power headroom report in response to a change of a pathloss is larger than a threshold, wherein the pathloss is associated with a specific beam or a set of beams.

In one embodiment, the UE could determine whether the pathloss has changed if a transmission associated with the specific beam or the set of beams is scheduled. The specific beam could be a specific UE beam or a specific transmission or reception point (TRP) beam. The set of beams could be a set of UE beams or a set of TRP beams. The set of beams could be associated with a same TRP beam, a same set of TRP beams, or a same TRP.

In one embodiment, the change of the pathloss could be derived from a comparison of a same UE beam or a same set of UE beams. The change of the pathloss could also be derived from a comparison between a current pathloss value, associated with the specific beam or the set of beams, and a previous pathloss value, associated with the specific beam or the set of beams. The pathloss could be derived from a downlink signal measured on the specific beam or measured on the set of beams.

Referring back to FIGS. 3 and 4, in one exemplary embodiment of a UE, the device 300 includes a program code 312 stored in the memory 310. The CPU 308 could execute program code 312 to enable the UE (i) to use multiple beams for transmission, and (ii) to trigger a power headroom report in response to a change of a pathloss is larger than a threshold, wherein the pathloss is associated with a specific beam or a set of beams. Furthermore, the CPU 308 can execute the program code 312 to perform all of the above-described actions and steps or others described herein.

Figure 27:
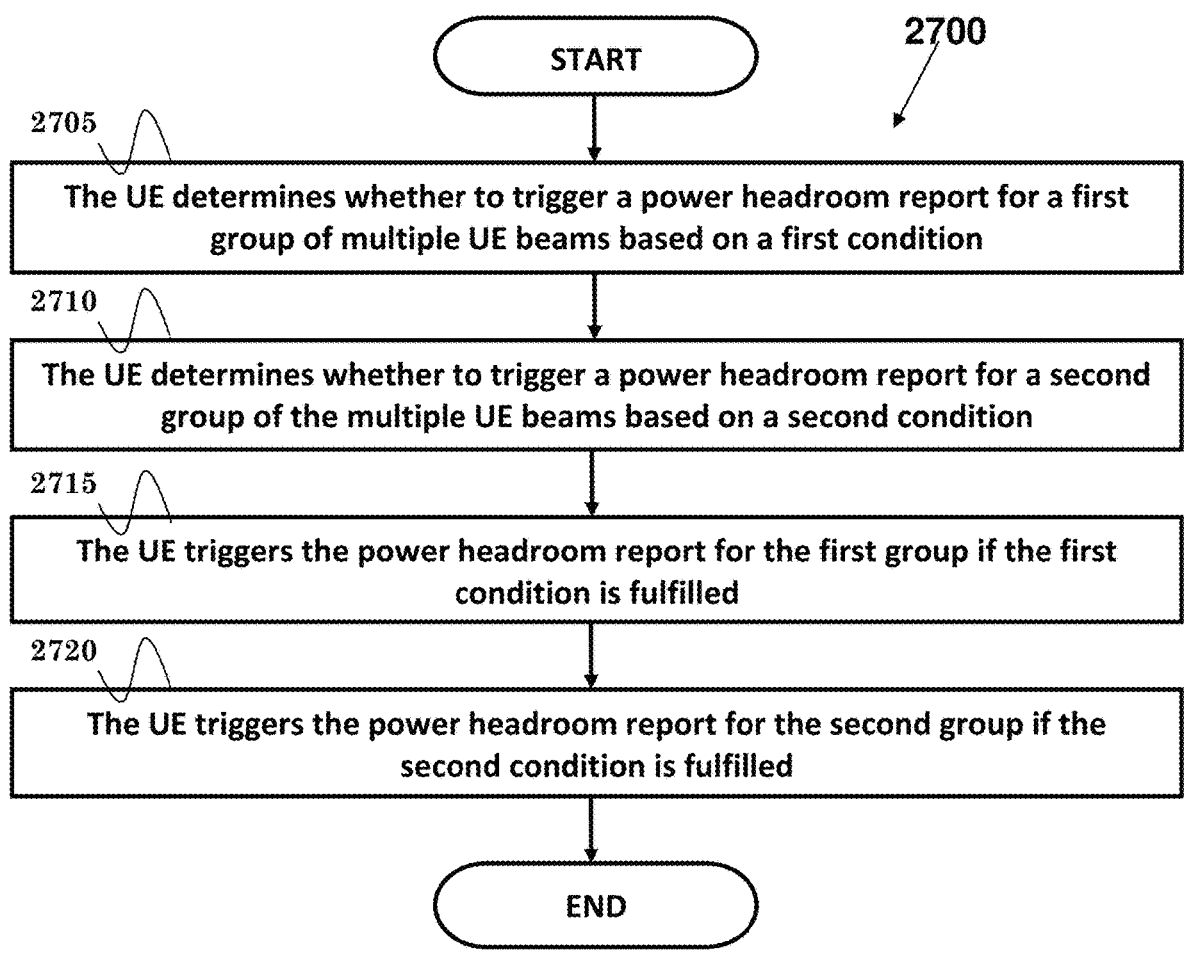
FIG. 27 is a flow chart according to one exemplary embodiment.

FIG. 27 is a flow chart 2700 according to one exemplary embodiment from the perspective of a UE. In step 2705, the UE determines whether to trigger a power headroom report for a first group of multiple UE beams based on a first condition. In step 2710, the UE determines whether to trigger a power headroom report for a second group of the multiple UE beams based on a second condition. In step 2715, the UE triggers the power headroom report for the first group if the first condition is fulfilled. In step 2720, the UE triggers the power headroom report for the second group if the second condition is fulfilled.

In one embodiment, the first condition could be a pathloss having changed more than a threshold for a UE beam within the first group or a combination of UE beams within the first group. The second condition could be a pathloss having changed more than a threshold for a UE beam within the second group or a combination of UE beams within the second group. The first group and the second group could be configured by a base station.

Referring back to FIGS. 3 and 4, in one exemplary embodiment of a UE, the device 300 includes a program code 312 stored in the memory 310. The CPU 308 could execute program code 312 to enable the UE (i) to determine whether to trigger a power headroom report for a first group of multiple UE beams based on a first condition, (ii) to determine whether to trigger a power headroom report for a second group of the multiple UE beams based on a second condition, (iii) to trigger the power headroom report for the first group if the first condition is fulfilled, and (iv) to trigger the power headroom report for the second group if the second condition is fulfilled. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for deriving a pathloss change, comprising:
   a UE (User Equipment) derives a first pathloss value from a first pathloss reference of a serving cell, wherein the first pathloss value is used for deriving a power headroom value included in a first power headroom report;
   the UE derives a second pathloss value from a second pathloss reference of the serving cell after deriving the first pathloss value, wherein the second pathloss reference is separate from the first pathloss reference and is used for power control for a first Physical Uplink Shared Channel (PUSCH) transmission on the serving cell;
   the UE derives the pathloss change based on the first pathloss value and the second pathloss value; and
   the UE determines whether a second power headroom report is triggered based on whether the pathloss change is more than a threshold.

2. The method of claim 1, wherein the second power headroom report is transmitted via the first PUSCH transmission when the second power headroom report is triggered.

3. The method of claim 1, wherein the first pathloss value is used for power control for a second PUSCH transmission on the serving cell, wherein the first power headroom report is transmitted via the second PUSCH transmission.

4. The method of claim 3, wherein a second downlink control information (DCI) scheduling the second PUSCH transmission indicates the first pathloss reference.

5. The method of claim 3, wherein the second PUSCH transmission is configured by a parameter ConfiguredGrantConfig and the ConfiguredGrantConfig indicates the first pathloss reference.

6. The method of claim 1, wherein a first DCI scheduling the first PUSCH transmission indicates the second pathloss reference.

7. The method of claim 1, wherein the first PUSCH transmission is configured by a parameter ConfiguredGrantConfig and the ConfiguredGrantConfig indicates the second pathloss reference.

8. The method of claim 1, wherein the first pathloss reference is a pathloss reference with the smallest entry of a pathloss reference configuration of the serving cell when the UE does not transmit any PUSCH transmission on the serving cell when transmitting the first power headroom report.

9. The method of claim 8, wherein the pathloss reference configuration is PUSCH-PathlossReferenceRS.

10. A method for deriving a pathloss change, comprising:
    a UE (User Equipment) derives a first pathloss value from a first pathloss reference of a serving cell, wherein the first pathloss value is used for deriving a first power headroom value included in a first power headroom report;
    the UE derives a second pathloss value from a second pathloss reference of the serving cell after deriving the first pathloss value, wherein the second pathloss reference is separate from the first pathloss reference and is used for deriving a second power headroom value;
    the UE derives the pathloss change based on the first pathloss value and the second pathloss value; and
    the UE determines whether a second power headroom report to include the second power headroom value is triggered based on whether the pathloss change is more than a threshold.

11. The method of claim 10, wherein the second pathloss value is not used for power control for a Physical Uplink Shared Channel (PUSCH) transmission on the serving cell.

12. The method of claim 10, wherein the smallest entry of a pathloss reference configuration of the serving cell is the second pathloss reference.

13. The method of claim 10, wherein the first pathloss value is used for power control for a PUSCH transmission on the serving cell, wherein the first power headroom report is transmitted via the PUSCH transmission.

14. The method of claim 13, wherein a downlink control information (DCI) scheduling the PUSCH transmission indicates the first pathloss reference.

15. The method of claim 13, wherein the PUSCH transmission is configured by a parameter ConfiguredGrantConfig and the ConfiguredGrantConfig indicates the first pathloss reference.

16. The method of claim 10, wherein the first pathloss reference is a pathloss reference with the smallest entry of a pathloss reference configuration of the serving cell when the UE does not transmit any PUSCH transmission on the serving cell when transmitting the first power headroom report.

17. A User Equipment (UE) for deriving a pathloss change, comprising:
    a control circuit;
    a processor provided with the control circuit; and
    a memory operatively coupled to the processor;

wherein the processor is configured to execute a program code to:

derive a first pathloss value from a first pathloss reference of a serving cell, wherein the first pathloss value is used for deriving a power headroom value included in a first power headroom report;

derive a second pathloss value from a second pathloss reference of the serving cell after deriving the first pathloss value, wherein the second pathloss reference is separate from the first pathloss reference and is used for power control for a first Physical Uplink Shared Channel (PUSCH) transmission on the serving cell;

derive the pathloss change based on the first pathloss value and the second pathloss value; and determine whether a second power headroom report is triggered based on whether the pathloss change is more than a threshold.

18. The UE of claim 17, wherein the second power headroom report is transmitted via the first PUSCH transmission when the second power headroom report is triggered.

19. The UE of claim 17, wherein the first pathloss value is used for power control for a second PUSCH transmission on the serving cell, wherein the first power headroom report is transmitted via the second PUSCH transmission.

20. The UE of claim 17, wherein the first pathloss reference is a pathloss reference with the smallest entry of a pathloss reference configuration of the serving cell when the UE does not transmit any PUSCH transmission on the serving cell when transmitting the first power headroom report.

* * * * *